(12) United States Patent
Deiss

(10) Patent No.: US 10,286,624 B2
(45) Date of Patent: May 14, 2019

(54) SEALING TAPE ROLL

(71) Applicant: ISO-Chemie GmbH, Aalen (DE)

(72) Inventor: Martin Deiss, Abtsgmuend (DE)

(73) Assignee: Iso-Chemie GmbH, Aalen (DE)

( * ) Notice: Subject to any disclaimer, the term of this patent is extended or adjusted under 35 U.S.C. 154(b) by 0 days.

(21) Appl. No.: 16/116,179

(22) Filed: Aug. 29, 2018

(65) Prior Publication Data

US 2019/0070825 A1 Mar. 7, 2019

(30) Foreign Application Priority Data

Sep. 1, 2017 (EP) ..................................... 17189098
Aug. 7, 2018 (EP) ..................................... 18187766

(51) Int. Cl.
| B32B 3/26 | (2006.01) |
| B32B 5/18 | (2006.01) |
| B32B 27/06 | (2006.01) |
| B65H 18/28 | (2006.01) |
| B32B 7/12 | (2006.01) |

(52) U.S. Cl.
CPC .................. B32B 3/26 (2013.01); B32B 5/18 (2013.01); B32B 7/12 (2013.01); B32B 27/065 (2013.01); B65H 18/28 (2013.01); *B32B 2307/7265* (2013.01); *B32B 2405/00* (2013.01)

(58) Field of Classification Search
CPC ........... B32B 3/26; B32B 5/18; B32B 27/065; B32B 7/12; B32B 2405/00; B32B 2307/7265; B65H 18/28
See application file for complete search history.

(56) References Cited

U.S. PATENT DOCUMENTS

| 4,401,716 A | 8/1983 | Tschudin-Mahrer |
| 2010/0003465 A1 | 1/2010 | Deiss |
| 2010/0009118 A1 | 1/2010 | Deiss |
| 2016/0059536 A1 | 3/2016 | Deiss |
| 2016/0060068 A1 | 3/2016 | Deiss |

FOREIGN PATENT DOCUMENTS

| DE | 20 2013 100308 U1 | 4/2014 |
| EP | 2 620 565 A1 | 7/2013 |
| EP | 2 990 552 A1 | 3/2016 |

OTHER PUBLICATIONS

EP 17 18 9098 Search Report dated Feb. 21, 2018.

*Primary Examiner* — Michael C Miggins
(74) *Attorney, Agent, or Firm* — Jansson Munger McKinley & Kirby Ltd.

(57) ABSTRACT

A sealing tape roll which comprises barrier layers extending in the radial direction that are arranged axially between layers of foam and consist of a sealing element wound up into the sealing tape roll. The sealing element includes at least three sealing tape sections which are arranged next to each other in a functional direction of the sealing element. First and second barrier layer sections are each arranged between two adjacent sealing tape sections and parallel to the side surfaces of the sealing element. The first and second barrier layer sections each comprise two legs connected to each other. The legs of the first barrier layer section are connected to each other in an area of the bottom surface of the sealing element and the legs of the second barrier layer section are connected to each other in an area of the top surface of the sealing element.

15 Claims, 11 Drawing Sheets

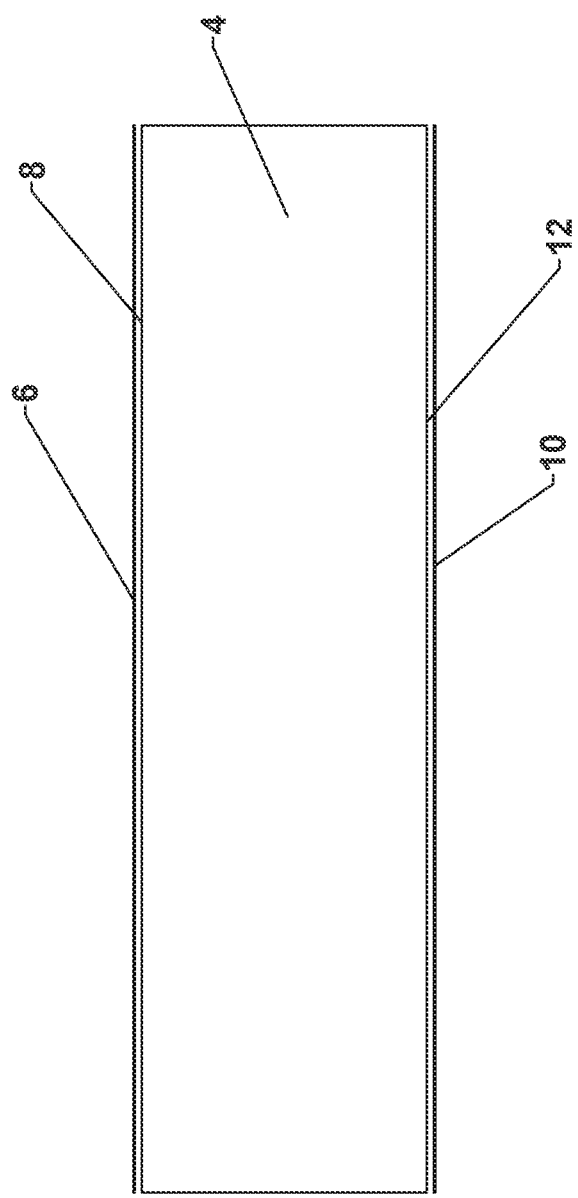

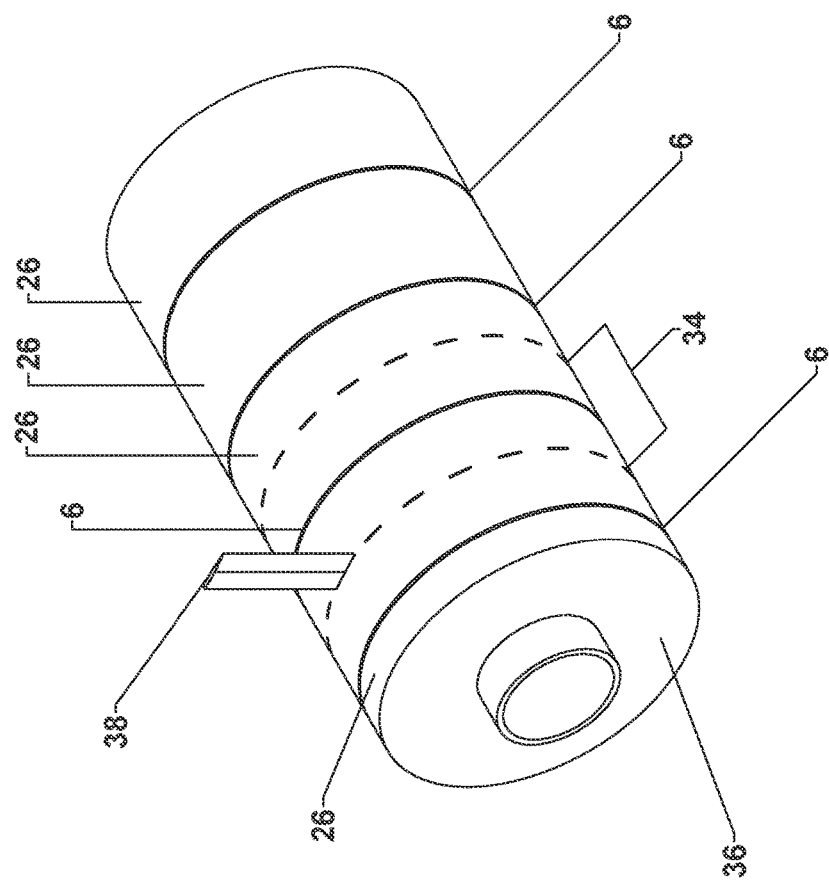

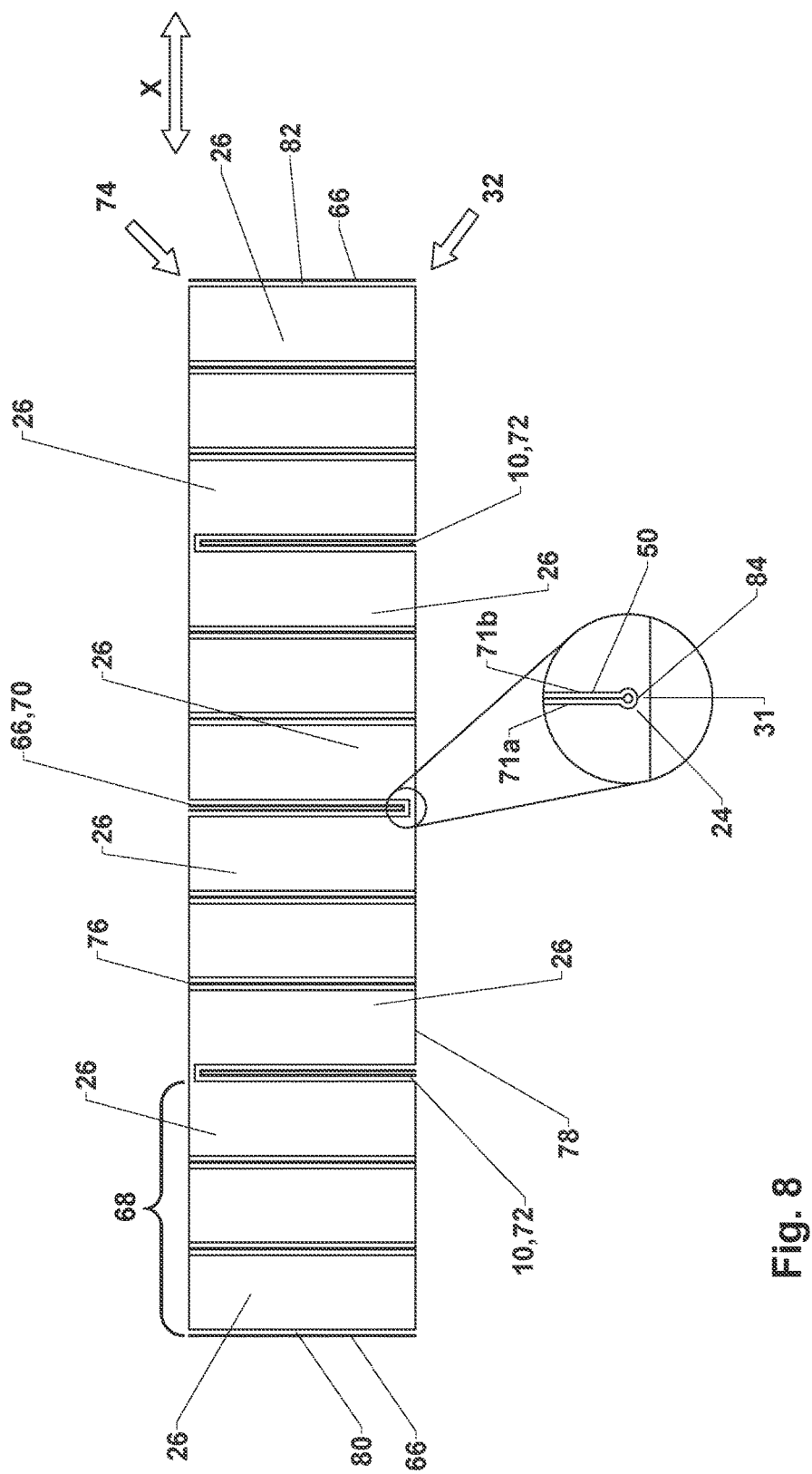

SEALING TAPE ROLL

CROSS REFERENCE TO RELATED APPLICATION

This application claims priority to European Patent Application No. EP 17 189 098.1, filed Sep. 1, 2017, and European Patent Application No. 18 187 766.3, filed Aug. 7, 2018, the entire contents of which are incorporated by reference in their entirety.

FIELD OF THE INVENTION

The present invention relates to a sealing tape roll of flexible, compressible foam with at least one barrier layer extending in the radial direction.

BACKGROUND OF THE INVENTION

Sealing tapes unwound from sealing tape rolls are usually used to seal joints such as those between a frame profile of a window or a door and a building wall to seal the joints against drafts and driving rain. Films additionally provided on a lateral surface of the sealing tape increase the impermeability of the tape to water vapor; see, for example, U.S. Pat. No. 4,401,716, US 2010/009118 A1 and US 2010/003465 A1. Because these films, which are applied externally to the sealing tape, suffer from the disadvantage that they can be damaged during the transport or installation of the sealing tape, it is now common practice for films forming a barrier layer to be arranged inside the sealing tape.

Various methods are known for the production of sealing tapes with barrier layers on the inside. These methods involve the introduction of films or similar materials capable of forming a barrier layer into a sealing tape. US 2016/060068 A1, for example, describes a method in which at least two foam strips are provided. One of the side surfaces of one of the foam strips is provided with a film strip and with an adhesive tape strip or an adhesive-like fluid medium. The two foam strips are then brought together in such a way that a foam-barrier layer web is obtained, in which a barrier layer is arranged between adjacent foam strips, the barrier layer being formed by the film strip and the adhesive strip or adhesive-like fluid medium. In this method, it has been found disadvantageous that a considerable amount of effort is required to make available individual foam strips equipped with barrier layer material. The larger the number of barrier layers which the sealing tape is intended to have, the greater this effort.

US 2016/059536 A1 describes an alternative method for the production of sealing tape rolls with an interior barrier layer. In this method, a foam web is produced first. Then a plurality of cuts extending in the longitudinal direction is made in the foam web to form parallel foam strips. Then a film strip and an adhesive tape strip or an adhesive-like fluid medium are introduced into each of the intermediate spaces between two adjacent foam strips produced by the cuts. All of the foam strips are bonded together to produce a foam-barrier layer web, in which the foam strips and the at least one barrier layer alternate. It is sometimes difficult to introduce the barrier layer material reliably into the very narrow intermediate spaces and to ensure that the material is distributed uniformly over the entire thickness of the foam web or of the foam strips. It is possible only with considerable difficulty to check the introduced barrier layer after the material has been introduced. In addition, complicated deflection devices must be provided to introduce a film strip into an intermediate space formed by a cut, for example.

OBJECTS OF THE INVENTION

It is an object of the present invention to provide a sealing tape roll with at least one interior, radially-oriented barrier layer in which the sealing tape roll can be produced easily, inexpensively and reliably.

SUMMARY OF THE INVENTION

According to an aspect of the invention, the sealing tape roll is of flexible, compressible foam with at least two barrier layers extending in the radial direction, which are arranged axially between two layers of foam, and consists of a sealing element wound up into the sealing tape roll.

The sealing element includes a top surface, a bottom surface, and two side surfaces connecting the top surface to the bottom surface, as well as at least three sealing tape sections which are arranged next to each other in the functional direction of the sealing element. The functional direction is parallel to the bottom surface and substantially perpendicular to the side surfaces of the sealing element. The functional direction is also perpendicular to the longitudinal direction of the sealing element, wherein the longitudinal direction is parallel to the bottom surface and parallel to the side surfaces of the sealing element. The at least three sealing tape sections are arranged axially next to each other in the sealing tape roll. The sealing element also comprises at least one first barrier layer section and at least one second barrier layer section, which each are arranged between two adjacent sealing tape sections and are parallel to the side surfaces of the sealing element. The sealing element is wound up into the sealing tape roll around an axis which is parallel to the functional direction of the sealing element. The side surfaces of the sealing element form end surfaces of the sealing tape roll. Consequently, the first barrier layer section and the second barrier layer section in the sealing tape roll are arranged parallel to the end surfaces of the sealing tape roll. The at least one first barrier layer section comprises two legs, which are connected to each other. The at least one second barrier layer section also comprises two legs, which are connected to each other. The legs of the at least one first barrier layer section are connected to each other in the area of the bottom surface of the sealing element, and the legs of the at least one second barrier layer section are connected to each other in the area of the top surface of the sealing element.

In this way, a sealing element, preferably in the form of a sealing tape, is provided, which can be produced especially easily and cheaply. The main reason for this is that a barrier layer material can be applied easily, efficiently, and easily verifiably to a surface of a foam web of large surface area; and then, by cutting the foam web and folding over the individual strips, the barrier layer material can be arranged in the interior of a foam-barrier layer web. A complicated, difficult-to-check introduction of barrier layer material into cuts in a sealing tape or the preparation of a plurality of foam strips, parts of which are provided with a barrier layer material, is not necessary for the production of the sealing tape roll according to the invention. It is also possible to produce easily a foam-barrier layer web with a plurality of foam strips and barrier layers, as can be derived from the following description, which refers to the figures.

Sealing tape rolls also offer the advantages of space-saving storage and ease of transport and handling of the sealing elements or sealing tapes. The sealing element is preferably wound up in compressed form into a sealing tape roll. The compressed thickness of a sealing element in the sealing tape roll is preferably less than 25% of the thickness of the original foam. In preferred embodiments, the sealing element has a compressed thickness of less than 20%, even more preferably of less than 15% and/or greater than 5% of the thickness of the original foam.

In an expanded state, the sealing element preferably comprises a substantially rectangular cross section. The width of the sealing element is defined as the distance between the side surfaces of the sealing element; the thickness is defined as the distance between the top surface and the bottom surface of the sealing element; and the length of the sealing element is defined as the distance in the longitudinal direction. In a cross-section perpendicular to the longitudinal direction, the top and bottom surfaces form the wide sides of the sealing element, and the side surfaces form the narrow sides of the sealing element in this cross section. It is preferable for the length of the sealing element to be considerably greater than its width and its thickness. In this case, one usually speaks of a "sealing tape." Because the side surfaces of the sealing element form the end surfaces of the sealing tape roll, the width of the sealing tape roll is substantially equal to the width of the sealing tape. Slight deviations can occur in that the side surfaces can bulge slightly outward from the wound-up sealing tape roll in the compressed state.

The "installed state" of the sealing element or of a corresponding sealing tape is defined as the state in which the sealing element is arranged in a joint between a frame element, e.g., a window or door frame, and a building wall. The longitudinal direction of the sealing element extends along the surrounding joint, and the sealing element lies flat by its bottom and top surfaces against the frame element and the building wall. One side surface of the sealing element faces the interior of the room, and the opposite side surface faces the outside of the room. The functional direction of the sealing element is parallel to the bottom surface of the sealing element, extends from the inside of the room to the outside of the room, and, in the case of a rectangular sealing element, is perpendicular to the side surfaces of the sealing element. The functional direction is therefore perpendicular to the longitudinal direction of the sealing tape.

According to an aspect of the invention, the at least one first barrier layer section and the at least one second barrier layer section lie on a plane parallel to the longitudinal direction of the sealing element, transverse to the functional direction, and transverse to the longitudinal direction of the sealing element. The barrier layer sections, therefore, in the installed state, run along the surrounding joint and over a large part of the joint cross section in a plane between the frame element and the masonry. It is therefore possible for water vapor to diffuse through the sealing element in the functional direction substantially only through the barrier layer sections.

In one possible embodiment, the sealing element can also comprise barrier layers which are parallel to the functional direction and extend in the longitudinal direction of the sealing element and/or barrier layers which are parallel to the functional direction and transverse to the longitudinal direction. Such barrier layers divide the sealing element into smaller sections, between which water vapor can diffuse within the sealing element only to the extent that the barrier layers in question allow it. Inhomogeneities in the foam which can lead to the diffusion of water vapor within the sealing element toward areas of lower water vapor diffusion resistance and which can thus negatively affect the water vapor permeability of the sealing element can thus be locally limited to the small section of the sealing element in question.

In one embodiment, the sealing element also comprises a drainage layer for collecting and effectively discharging water from the sealing element. Water which arrives undesirably in the sealing element as a result of driving rain, for example, can thus be conducted away from the sealing element. A wet sealing element or sealing tape would lead disadvantageously to an increase the thermal conductivity and correspondingly to a loss of thermal insulation through the sealing element. The drainage layer can comprise a foam strip or be formed by a barrier layer, preferably by a barrier layer section extending parallel to the side surface of the sealing element. A barrier layer can be configured as a multilayer structure, for example, wherein one layer forms a drainage layer which is able to conduct away intruding water. The drainage layer can comprise, for example, a membrane and/or layer of nonwoven material. If the drainage layer is formed out of a foam, the sealing tape comprises, for example, at least three adjacent sealing tape sections, at least one of which, preferably an inner sealing tape section, is configured as the drainage layer. The drainage layer then comprises at least predominantly open-cell foam, which absorbs water and can allow the water to escape through the open pores by the force of gravity. At the same time, the use of a foam leads to almost no negative effect on the insulating properties of the sealing element. In addition, the drainage layer can also comprise here a layer of nonwoven material.

In an especially preferred embodiment, the sealing element comprises several first and/or several second barrier layer sections, wherein, when seen the functional direction, a first barrier layer section and a second barrier layer section always occur in alternation. As a result, the sealing element can be produced even more easily and can comprise a substantially rectangular cross section with flat bottom and top surfaces.

It is preferred that the at least one first barrier layer and the at least one second barrier layer section comprise a film. The at least one first barrier layer section and the at least one second barrier layer section can, however, also comprise other materials, especially an adhesive.

It is especially preferable for the barrier layers or barrier layer sections described here to be formed out of a film-like material or an adhesive, especially to be formed out of a film strip, an adhesive tape strip, or an adhesive-like fluid medium. Such barrier layer materials can be very easily and easily verifiably applied to the foam of the sealing tape and bonded to it. In addition, these materials are especially appropriate as barrier layer materials, because their sealing properties can be adjusted to suit the requirements.

For example, the barrier layers described here are formed out of a film-like material, such as film of polyamide, polyurethane, polypropylene, or copolymers thereof. The barrier layers described here can also be formed by an adhesive, e.g., a dispersion adhesive, especially an acrylate adhesive. The barrier layers can all be made of the same material or can be formed out of different materials.

The barrier layers can also be configured with "humidity variability," that is, their resistance to the diffusion of water vapor changes as a function of the humidity of the environment of the barrier layer. The characteristic parameter which describes the resistance to the diffusion of water vapor is the water vapor diffusion value relative to the thickness of a layer of air in meters, the so-called sD value.

A barrier layer preferably comprises an sD value of 0.05-100 m, more preferably of 0.1-25 m or of 0.2-15 m (at a relative humidity (RH) of 25%). The testing of the sD value is carried out according to DIN EN ISO 12572. Independently of this or in combination with it, a barrier layer can have an sD value of 0.02-10 m or of 0.03-6 m or of 0.05-2 m at 72.5% RH according to DIN EN ISO 12572. For example, the sD value can be in the range of 1-10 m at 25% RH and in the range of 0.1-5 m at 72.5%. To the extent that DIN EN ISO 12572 does not specify otherwise, the sD values pertain to a temperature of 20° C.

The sD value of a barrier layer at 25% RH preferably differs from the value at 72.5% RH (at 20° C. in both cases) by a factor of ≥1.1-1.2, preferably of ≥1.5-2, possibly up to a factor of 3-5 or up to 10 or 20 or even up to 50 or up to 100 or 150 or more, as a result of which the dependence of the water vapor diffusion of the barrier layer on the atmospheric humidity is defined. The difference between the two sD values of the barrier layer at the two indicated relative humidities can be ≥0.25 m or ≥0.5 m or preferably ≥0.75-1 m; it can be, for example, up to 5-10 m or up to 20-25 m or above. As a result, a satisfactory dependence of the water vapor diffusion resistance is obtained under different environmental conditions, such as in summer or winter or in different climate zones, which means that, even when the relative humidity of the environment changes, it is still possible to achieve an adequate adaptation of the water vapor diffusion resistance to the environmental conditions. The sD value at 25% RH is preferably higher than the value at 72.5% RH.

The barrier layers preferably consist at least partially of a synthetic, water-swellable polymer.

A barrier layer comprises a thickness between 1 μm and 1 mm, preferably a thickness of 1-500 μm or of 2-250 μm, especially preferably in the range of 5-100 μm or 5-50 μm.

The barrier layers can also consist of multiple plies. In particular, they can be configured as multi-ply composite layers. At least one ply of at least one additional material can be arranged on one or both sides of the functional layer. The one or both additional plies, which each cover the functional layer either partially or completely, can protect this layer and support or carry it and thus increase the stability of the barrier layers. The individual plies can be made of the same or different materials.

The plies arranged on one or both sides can in particular consists of nonwovens, fabric, or grids of inert materials such as polyethylene, polyurethane, polypropylene, polyester, glass fibers, or viscose, possibly also perforated films, especially films of polyethylene, polyurethane, polypropylene, or polyester. The layers can in general consist of any suitable material which is present in the form of layers and which preferably has sD values which are not higher than those of the functional layer. The plies on one or both sides can consist of a dispersion adhesive, especially an acrylate adhesive.

The thickness of the layers of the barrier layers enclosing the functional layer can have, in total per side and independently of each other, a thickness of 10-2,000 μm, preferably of 10-500 μm, especially of 10-250 μm, and especially preferably of 10-90 μm.

The barrier layers preferably form, in general, a continuous, nonporous, nonperforated layer; it is especially preferable for these layers to be at least substantially impermeable to air. The permeability of the barrier layers or barrier plies to air is preferably in the range of 0.01-50 l/(m2s), more preferably in the range of ≤0.01-20 l/(m2s). The permeability to air is preferably ≤3-6 l/(m2s) or preferably ≤1-2 l/(m2s) or ≤0.2-0.5 l/(m2s), or especially preferably ≤0.1-0.3 l/(m2s) according to DIN EN ISO 9237; the test area is 100 cm2 at a measurement pressure (negative pressure) of 1.0 mbar; the test device is a Frank 21443, or it is so low that it is no longer measurable.

The decisive point for the air permeability of a sealing element is generally the total reduction of the air flow in one direction across the entire cross section of the sealing element. If, for example, a plurality of barrier layers and foam strips are arranged one behind the other in alternation in the functional direction of the sealing element or sealing tape, the reduction of the air flow through all these barrier layers and foam strips must be taken into account. The air permeability of the total sealing element or sealing tape in the functional direction is preferably less than 50 $l/(m^2s)$ and more preferably less than 30 $l/(m^2s)$ under the measurement conditions indicated above.

In one embodiment, the sealing element or the sealing tape roll also comprises an additional material, which is applied to one surface of the sealing element or to the plurality of barrier layers or is contained in the impregnating agent. The additional material can give the sealing element special properties. Examples of additional materials include in particular materials for fire safety (e.g., expanded graphite, incombustible solids, $CO_2$ emitters, etc.), materials for insulation (e.g., PU foam, resins, sealants, etc.), materials for sealing against moisture (e.g., hydrophobic or hydrophilic substances, substances which swell on contact with water, etc.), materials for sound damping, materials for controlled ventilation (e.g., catalysts, etc.), materials for hygienic purposes (e.g., disinfectants, etc.), and/or materials for triggering the expansion of the sealing tape (e.g., blowing agents, heat sources, etc.). With respect to both the arrangement and the type and properties of the additional material, the skilled person will see alternatives which can be used to meet the requirements in question.

The foam of the sealing element or of the sealing tape can be formed out of any desired open-cell or closed-cell flexible foam. For example, it can be made of polyurethane, polyethylene, polyvinyl chloride, or polypropylene, and it can be impregnated to delay its recovery after compression. The unit weight of flexible foams of this type is in the range of 20-200 $kg/m^3$.

Side-by-side sealing tape strips or sealing tape sections preferably consist of the same material. Alternatively, sealing tape sections or sealing tape strips can be formed out of different materials.

The flexible foam preferably has a compression stress value of more than 2 kPa. The compression stress is preferably more than 2.1 kPa, more preferably more than 2.2 kPa, and especially preferably more than 2.3 kPa. The compression stress value is preferably less than 4 kPa, preferably less than 3.8 kPa, and more preferably less than 3.6 kPa. The compression stress is a measure of the strength of the foam. The values given here are relative to a compression of 40% of the original height. The compression stress is determined according to DIN EN ISO 3386; it is the CV40 value which is stated.

The sealing elements are preferably impregnated at least partially and preferably completely with an impregnating agent to delay their recovery. The impregnating agent preferably comprises an acrylate dispersion. In an advantageous embodiment, the acrylate dispersion comprises acrylate polymer particles dispersed in the homogeneous phase. The foam is preferably impregnated with a certain weight-percentage of acrylate dispersion for delayed recovery in such a way that, after compression of the sealing tape by approximately 9-13%, the sealing element recovers to the point that it seals the joint in less than 24 hours at 20° C. and 50% RH.

A foam impregnated for delayed recovery preferably comprises an air permeability in a range of 50-1,000 l/(m²s), more preferably of 60-600 l/(m²s), and especially preferably of 80-400 l/(m²s). The data on air permeability specified within the scope of this application relate to a determination according to DIN ISO 9237 by means of a Frank 21443 under standard conditions based on a 10-mm-thick foam piece (completely relaxed) with a test surface area of 100 cm2 at a negative measurement pressure of 1.0 bar.

In a preferred embodiment, the legs of the at least one first barrier layer section and the legs of the at least one second barrier layer section are parallel to each other, and the two legs of each barrier layer section comprise a curved part, which connects the legs. Thus the legs can be formed by folding over the barrier layer section in question, wherein, after the folding-over, the two legs of a barrier layer section rest flat against each other to form a continuous sealing element. The curved part connecting the legs is formed during the folding-over of the sealing tape sections by the bending of the barrier layer section in question.

The curved part can be in the shape of a U or a V. The U or V shape is obtained by folding or creasing the barrier layer section in question. The apex of the U-shaped or V-shaped curved part extends along a straight line, which is parallel to the longitudinal direction of the sealing element. A U-shape of the curved part is obtained in particular when, after the folding-over of the sealing tape sections, no pressure or only very slight pressure is applied laterally to the sealing element and thus to the legs of the barrier layer section in question. If a greater pressure is applied to the legs, the barrier layer section in question can become creased, as a result of which the V-shape is formed. The curved part, however, can also have a shape deviating from a U or V shape.

When a barrier layer is applied homogeneously to a foam web, the legs of the at least one first barrier layer section are integral in form, and the legs of the at least one second barrier layer section are integral in form. In particular, the legs of a barrier layer section and the curved part connecting the legs consist of single piece of the original barrier layer. If, however, different barrier layer materials are applied to the foam web or if a barrier layer is applied which is assembled from several components, the legs can also not be integral in form.

To increase the cohesion and stability of the sealing element, the two legs of a first or of a second barrier layer section are preferably bonded together at least in certain areas. A foam web provided with barrier layers or a web produced from several foam webs and barrier layers is guided in its entirety through a heating tunnel until the external barrier layers reach their melting or adhesion point. Only then are the individual sealing tape sections folded over, so that the legs of the barrier layer sections come to rest against each other and preferably are bonded or fused together by the application of pressure perpendicular to the legs. In this case, it is easily possible to bond the legs substantially completely to each other. It is also possible, however, for a foam-barrier layer web in which the barrier layer sections are already in the interior of the web to be guided through appropriate heating elements, wherein only edge areas of the barrier layer sections are partially melted. The legs of the barrier layer sections are then bonded together only at certain points. It is obvious that the legs of the barrier layer sections can form a unit especially as a result of the melting of at least certain areas or of their entire area, and it may then be impossible to differentiate one of the individual legs from the other.

The legs of the at least one first and of the at least one second barrier layer section preferably lie flat against a foam strip adjacent to the leg in question. As a result, both a reliable bond between the legs and the associated foam strip and also the cohesion of the sealing element in the transverse direction are guaranteed.

It is especially preferred that at least one additional barrier layer section which is parallel to the side surfaces be accommodated inside each sealing tape section. This can be achieved in particular in that, at the beginning of the production process, a plurality of foam webs and barrier layers are arranged in alternation on top of each other and bonded together, as a result of which a foam-barrier layer stack is formed. In addition to the barrier layer sections to be folded, at least one barrier layer section cut all the way through is also present in each sealing tape section.

From a foam-barrier layer web which is wider than the sealing element to be produced, i.e., which comprises a larger number of foam strips and barrier layers than the sealing element to be produced is supposed have, it is possible to produce a plurality of sealing elements or sealing tape rolls by cutting this foam-barrier layer web into several strips or by cutting through an intermediate roll produced from the foam-barrier layer web. The production process can be managed more effectively in this way.

It is especially preferred that two adjacent sealing tape sections of the sealing element be connected to each other by a connecting section. The connecting section comprises the at least one first barrier layer section or the at least one second barrier layer section. In addition, the connecting section can comprise a foam bridge. A foam bridge of this type is formed when the cuts made to form the sealing tape sections do not pass all the way through the foam web but when instead the depth of the cut is less than the thickness of the foam web(s). When the sealing tape sections are folded over, the foam bridges remain. The remaining foam bridge protects the barrier layer section adjacent to it especially during the introduction of the cuts. If one of the above-mentioned cuts were to pass all the way through the associated foam web, there would be the danger that the barrier layer section in question could be damaged. If, however, the connecting section comprises a barrier layer section without a foam bridge, the adjacent sealing tape sections can be folded ever especially easily, because a foam bridge increases the resistance to the folding-over operation.

It is therefore preferred that the foam bridge have a maximum thickness of 10 mm, more preferably a maximum of 5 mm, and even more preferably a maximum of 1-2 mm. In this way, it becomes easy to produce the sealing tape, while at the same time unintentional damage to the barrier layer material is avoided. In addition, the cohesion of the sealing element in the transverse direction is ensured independently of an optional bonding of the individual sealing tape sections, e.g., by the bonding of the legs of the sealing tape section. If the foam bridge is made as thin as possible, it is also possible to fold over the sealing tape sections easily, because the resistance created by the foam bridge is then correspondingly low.

Foam bridges between adjacent sealing tape sections, however, also make it possible for water vapor to diffuse through these foam bridges and thus around the barrier layer sections and through the sealing element. To ensure a satisfactory influence on the diffusion of water vapor through the sealing element by the interior barrier layer sections, the at least one first and the at least one second barrier layer sections extend over at least 50%, preferably over at least 75%, and more preferably over at least 90% of the thickness of the sealing element.

Finally, it is advantageous for the bottom surface of the sealing element to comprise an adhesive layer for bonding the sealing element to a frame element. The adhesive layer is thus arranged transverse to the barrier layers. The bottom surface of the sealing element, in the state in which it is rolled up into a sealing tape roll, is facing radially outward. The sealing element can thus be rolled along a frame element and quickly attached to it by the adhesive layer. The adhesive layer is preferably configured as a double-sided adhesive tape, which is covered on the outside surface with a peel-off protective film. The adhesive layer increases or ensures the cohesion of the sealing tape sections.

BRIEF DESCRIPTION OF THE DRAWINGS

FIG. 1b shows a schematic, cross-sectional view of a foam web onto which a first and a second barrier layer have been applied;

FIG. 5b shows a schematic, cross-sectional view of the step of cutting through an intermediate roll formed from the foam-barrier layer web of FIG. 4 to produce a plurality of sealing tape rolls in an alternative embodiment;

FIG. 8 shows a schematic, cross-sectional view of a foam-barrier layer web produced by the folding-over step of FIG. 7 with a detailed view of a connecting section.

DETAILED DESCRIPTION OF THE SPECIFIC EMBODIMENTS

Figure 1A:
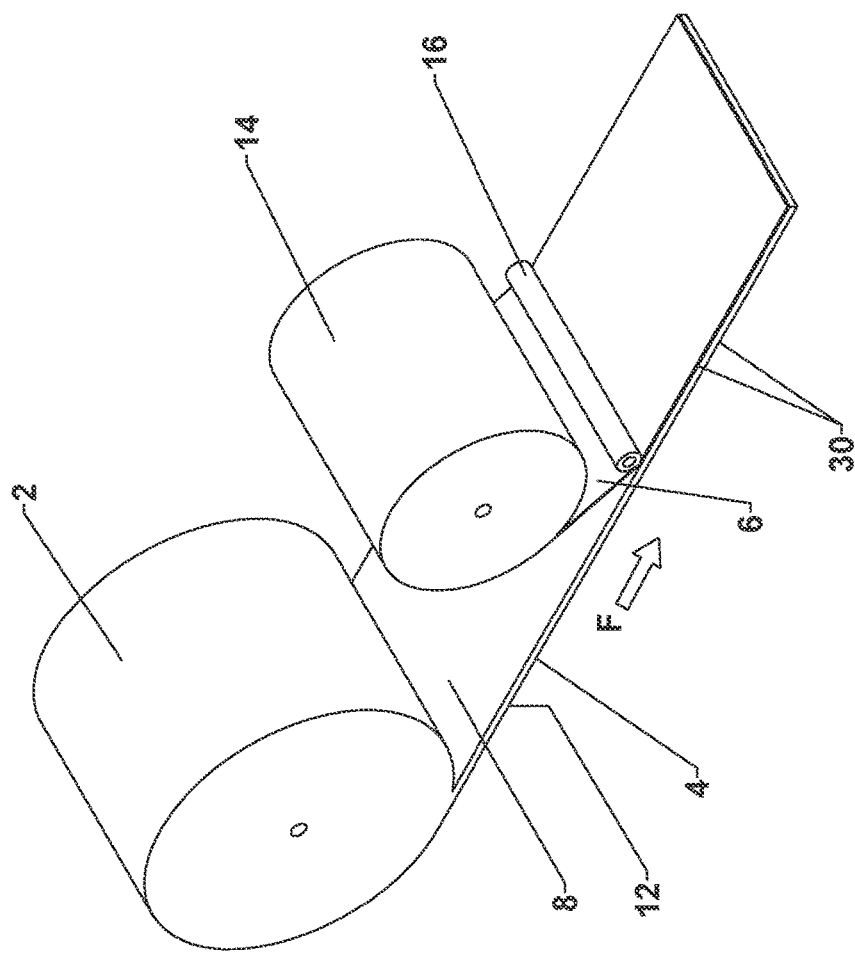
FIG. 1a shows by way of example the step of applying a first barrier layer to a first surface of a foam web.

FIG. 1a shows the first steps of an exemplary embodiment of a method for producing a sealing tape roll according to the invention. A flexible foam in the form of a wound-up foam web 4 is provided on an output roll 2. The flexible foam is provided on the output roll 2 in long lengths of up to 500 m, preferably of 3-300 m, and more preferably of 5-200 m. Any of the known open-cell, mixed-cell, or closed-cell flexible foams can be used as the foam, including those made of, for example, polyurethane, polyethylene, polyvinyl chloride, or polypropylene, provided that they recover after compression. Before it is subjected to further processing, the foam web 4 can have already been impregnated to delay its recovery in the known manner.

Because it is provided on output roll 2, foam web 4 can be transported and processed very easily. Foam web 4 is usually present on output roll 2 in an uncompressed or only slightly compressed state. It is also possible that foam web 4 could be on output roll 2 in a compressed state, but then, after it has been unwound from output roll 2, it must be ensured that the foam material has recovered in time to allow the further course of processing. The width of foam web 4 is usually in the range between 1 cm and 5 m, preferably in the range of 0.5-1.5 m. The thickness of foam web 4 in the relaxed state is usually in the range between 5 mm and 30 cm, preferably in the range between 10 mm and 10 cm.

After it has been unwound from output roll 2, foam web 4 is moved in a conveying direction, which is indicated by the arrow F. Then a first barrier layer 6 is applied to a first surface 8 of foam web 4 to form a laminated foam web. In the embodiment shown here, first surface 8 is formed by the upward-facing surface of foam web 4.

After foam web 4 has been unwound from output roll 2, a second barrier layer 10 (not shown) is also applied to a second surface 12 of the web opposite first surface 8. Second surface 12, in the present case, corresponds to the bottom surface of foam web 4. The method for producing a sealing tape roll according to the invention will be described below with reference to an embodiment in which a first barrier layer 6 and a second barrier layer 10 are provided.

In the embodiment shown in FIG. 1a, first barrier layer 6 is formed by a film web, which is provided on a film supply roll 14. Second barrier layer 10 can also be formed by a film web, also provided on a film supply roll. First barrier layer 6 in the form of a film web is preferably applied from above onto first surface 8 of foam web 4. Second barrier layer 10 is then applied correspondingly from below onto second surface 12 of foam web 4. The application of first barrier layer 6 and of second barrier layer 10 is usually carried out in the area of a bonding unit, which is illustrated schematically by roller 16. The application of first barrier layer 6 and second barrier layer 10 usually comprises the bonding of barrier layer 6, 10 in question to foam web 4, wherein the bonding step comprises in turn a step of heat application and/or a step of pressing barrier layer 6, 10 and foam web 4 together. When a film web is used, the bonding to foam web 4 in the bonding unit is preferably achieved by lamination.

First barrier layer 6 and second barrier layer 10 can each be formed by a web of a one-sided or double-sided adhesive tape. The adhesive side of such an adhesive tape is usually provided with a peel-off film, which is removed shortly before application to foam web 4. First barrier layer 6 and second barrier layer 10 can also be formed by a film web which itself comprises a layer of adhesive tape or a solid layer of a hot-melt adhesive. Finally, to form first barrier layer 6 and second barrier layer 10, it is also possible to apply an adhesive-like fluid medium to the foam web 4 by nozzles (e.g., hot-melt nozzle, flat nozzle, mixing nozzle) or by roller application (transfer roller). Depending on the adhesive, a bonding to foam web 4 can then occur, preferably in a bonding unit, wherein the adhesive is usually solidified. In principle, chemical and physical types of solidification can be considered. Here, too, the bonding of first barrier layer 6 or of second barrier layer 10 to foam web 4 will usually comprise a step of heat application and/or a step of pressing first barrier layer 6 or second barrier layer 10 and foam web 4 together. It is also possible to apply a spray adhesive to one side of the film web and to use this combination as first barrier layer 6 and second barrier layer 10. Finally, a skin of the foam material of foam web 4 itself can serve as barrier layer 6, 10, if the foam web has partially melted on the appropriate side and then hardened again or if foam web 4 has a skin because of the way in which it is manufactured.

Each previously mentioned step of heat application is carried out by a heating device, usually configured as a hot-air blower. Radiant heating by, for example, an infrared heater or a microwave heater can also be used.

It is also conceivable that first barrier layer 6 and second barrier layer 10 could be applied only to certain areas of corresponding first surface 8 or second surface 12. First and second barrier layers 6, 10 can also consist of multiple parts and can cover first and second surfaces 8, 12 completely or partially. For example, individual strips of a barrier layer 6, 10 can be applied longitudinally to first and/or second surface 8, 12. It is also possible to use different materials for first and second barrier layers 6, 10. If first or second barrier layer 6, 10 consists of multiple parts, the individual components of first or second barrier layer 6, 10 can also consists of different materials. As a result, a large number of possibilities of effectively adapting the properties of the sealing tape to the given requirements are available.

The function of first barrier layer 6 and of second barrier layer 10 in a sealing tape to be wound up into a sealing tape roll according to the invention lies preferably in a reduction or prevention of the passage of air and/or water vapor. First barrier layer 6 and second barrier layer 10 can also be configured with "humidity variability." This means that they change their resistance to the diffusion of water vapor as a function of the ambient humidity. For the first and second barrier layers, plastic films such as those consisting of polyolefins, polyurethane, polyvinyl chloride, polystyrene, polycarbonate, polyamide, or similar plastics as well as bioplastics, multilayer films (coex films) of different plastics, physically curing adhesives such as acrylate-based dispersion adhesives, hot-melt or similar adhesives, polycondensation adhesives such as silicones, hybrid polymers, and the like are appropriate choices.

It is also possible for a previously produced foam web 4 which has already been laminated with a first barrier layer 6 and/or a second barrier layer 10 to be wound up into an output roll 2.

It can also be desirable to apply an additional material (not shown). The additional material can be already bonded to first barrier layer 6 and/or to second barrier layer 10 and thus, applied along with the corresponding barrier layer 6, 10 to foam web 4 in a single step. Alternatively, the additional material can be applied to first surface 8 and/or second surface 12 of foam web 4, either over the entire surface or only in the form of strips, before first barrier layer 6 and second barrier layer 10 are applied. The additional material can also be applied externally to first barrier layer 6 and second barrier layer 10, either over their entire surfaces or only in the form of strips, after first barrier layer 6 and second barrier layer 10 have been applied to foam web 4. Additional materials which are especially worthy of consideration include materials for fire safety (e.g., expanded graphite, incombustible solids, $CO_2$ emitters, etc.), materials for insulation (e.g., PU foam, resins, sealants, etc.), materials for sealing against moisture (e.g., hydrophobic or hydrophilic substances, substances which swell on contact with water, etc.), materials for sound damping, materials for controlled ventilation (e.g., catalysts, etc.), materials for hygienic purposes (e.g., disinfectants, etc.), and/or materials for triggering the expansion of the sealing tape (e.g., blowing agents, heat sources, etc.) With respect to both the arrangement and the type and properties of the additional material, the skilled person has many alternatives which can be used to satisfy the requirements in question.

FIG. 1*b* shows a schematic cross-sectional view of foam web 4 after the application of first barrier layer 6 to first surface 8 and of second barrier layer 10 to second surface 12 of foam web 4.

In the following, the additional steps of an exemplary embodiment of the method for producing a sealing tape roll according to the invention are described for a first embodiment on the basis of FIGS. 2-5. In the first embodiment, a first and a second barrier layer 6, 10 are provided.

Figure 2:
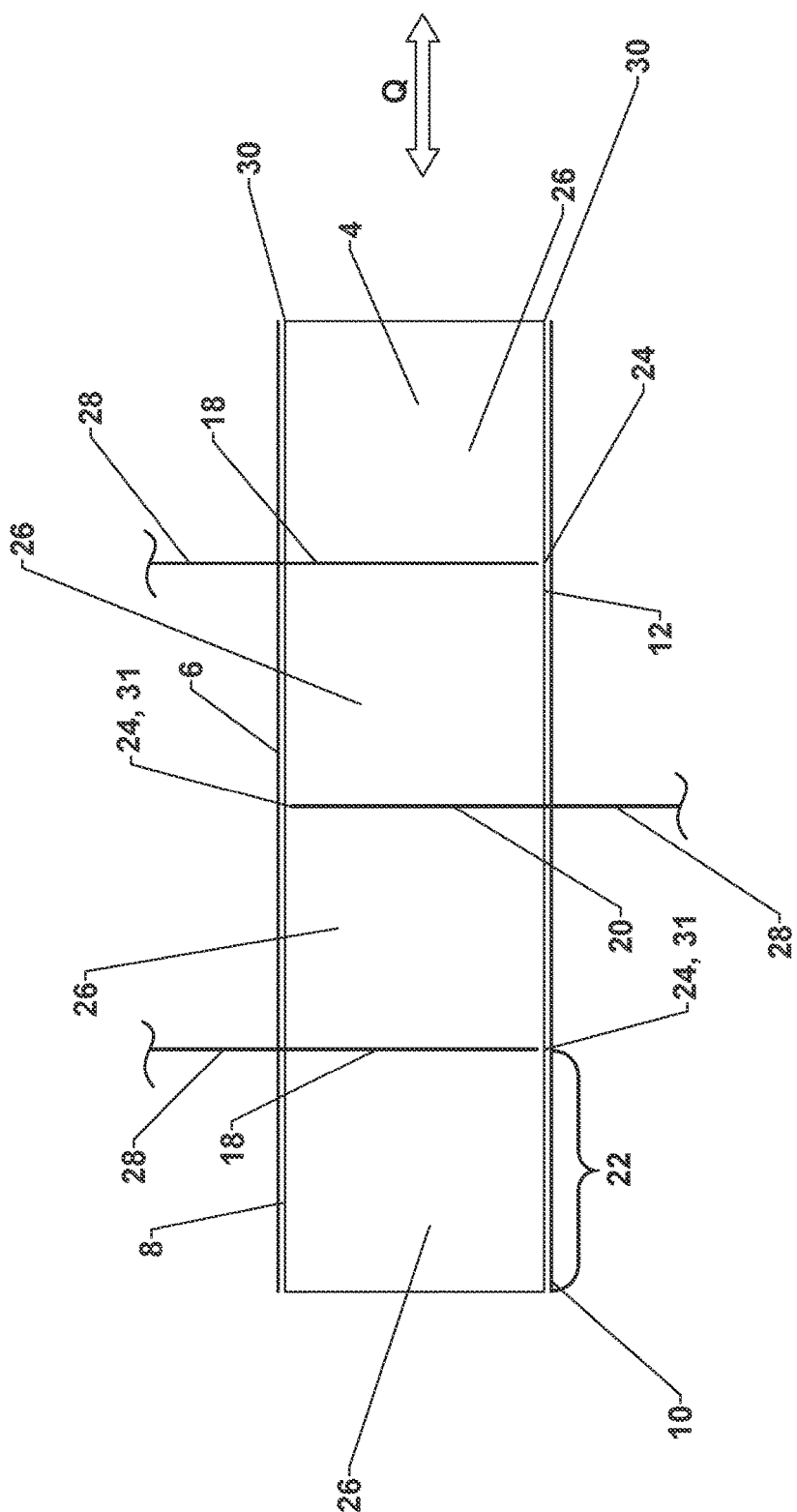
FIG. 2 shows a schematic cross-sectional view of the step of introducing first and second cuts into the foam web of FIG. 1b.

It can be seen in FIG. 2 how at least one first cut 18 (here, two first cuts 18) are introduced into first surface 6 of foam web 4 in a longitudinal direction of foam web 4, which is perpendicular to the plane of the drawing. The longitudinal direction is parallel to second surface 12, i.e., the bottom surface, of foam web 4 and parallel to the side surfaces of foam web 4 connecting first surface 8 and second surface 12 of foam web 4. The longitudinal direction is thus parallel to the conveying direction F. At least one second cut 20 (here, two second cuts 20) is introduced into second surface 12 of foam web 4 in the longitudinal direction of foam web 4 and offset in the transverse direction of foam web 4 from the at least one first cut 18. The transverse direction of foam web 4 is indicated in FIG. 2 by the arrow Q and is perpendicular to the longitudinal direction and parallel to second surface 12, i.e., to the bottom surface of foam web 4. If the section of first surface 8 is covered in the area of the at least one first cut 18 by first barrier layer 6, this barrier layer is cut through by the at least one first cut 18. Similarly, the at least one second cut 20 cuts through second barrier layer 10 if second surface 12 is covered by second barrier layer 10 in the area of the at least one second cut 20.

A "first cut" is to be understood as a cut which is introduced into the first surface of the foam web. A "second cut" is a cut which is introduced into the second surface of the foam web. The words "first" and "second" are not intended to define a chronological sequence for the introduction of the cuts into the foam web. For example, the second cut can be introduced before the first one is introduced. All the cuts, furthermore, can also be made simultaneously in the foam web.

As a result of the introduction of at least one first cut 18 and of at least one second cut 20, parallel sealing tape strips 22 are formed, wherein a connecting section 24 remains between two adjacent sealing tape strips 22. At least one first cut 18 divides first barrier layer 6 into a plurality of subsections or a plurality of first barrier layer subsections. At least one cut 20 divides second barrier layer 10 into a plurality of subsections or a plurality of second barrier layer sections. Each sealing tape strip 22 is formed by a foam strip 26 and by the subsections of first barrier layer 6 and of second barrier layer 10 attached to it.

At least one first cut 18 and at least one second cut 20 are preferably introduced by parallel knives 28 into foam web 4 in the longitudinal direction of the web and preferably parallel to longitudinal edges 30 of foam web 4. Longitudinal edges 30 are the edges of foam web 4 which are parallel to the conveying direction F and orthogonal to the axial direction of output roll 2. To introduce at least one first cut 18 and at least one second cut into foam web 4, it is possible to use not only knives 28 but also any other method known to the skilled person for cutting foam webs 4 such as sawing.

At least one first cut 18 and the at least one second cut 20 can pass either all the way through the foam web 4 or not pass all the way through the foam web 4. In the latter case, a foam bridge 31 remains between two adjacent foam strips 26.

The at least one second cut 20 can pass all the way through foam web 4 or not pass all the way through it. In the case that at least one second cut 20 passes all the way through foam web 4, the at least one connecting section 24 in the area of first surface 8 is formed by first barrier layer 6 alone. If at least one second cut 20 does not pass all the way through foam web 4, at least one connecting section 24 in the area of first surface 8 is formed by a foam bridge 31 and first barrier layer 6.

At least one first cut 18 can also be introduced into foam web 4 in such a way that it passes all the way through it or does not pass all the way through. If at least one first cut 18 passes all the way through foam web 4, at least one connecting section 24 in the area of second surface 12 is formed by second barrier layer 10 alone. If at least one first cut 18 does not pass all the way through foam web 4, so that a foam bridge 31 remains behind between adjacent foam strips 26, at least one connecting section 24 in the area of second surface 12 is formed by this foam bridge 31 and second barrier layer 10.

With a view to the following steps of the process, it is preferable for connecting sections 24 to be made as thin as possible. If connecting sections 24 are formed only by first barrier layer 6 and second barrier layer 10, these form a type of hinge joints in the area of connecting sections 24, i.e., joints which connect two adjacent foam strips 26 together in articulated fashion. Foam web 31 between adjacent foam strips 26 also forms a hinge joint of this type. It must be kept in mind, however, that, as the thickness of foam web 31 increases, the more difficult it becomes subsequently to fold over sealing tape strips 22 in area of connecting sections 24 which comprise a foam web 31. If foam webs 31 are provided, they therefore preferably have a maximum thickness of 10 mm, more preferably a maximum of 5 mm, and even more preferably a maximum of 1-2 mm. Foam webs 31 are especially well adapted to protecting first barrier layer 6 and second barrier layer 10 from damage when at least one first cut 18 and at least one second cut 20 are introduced.

Figure 3:
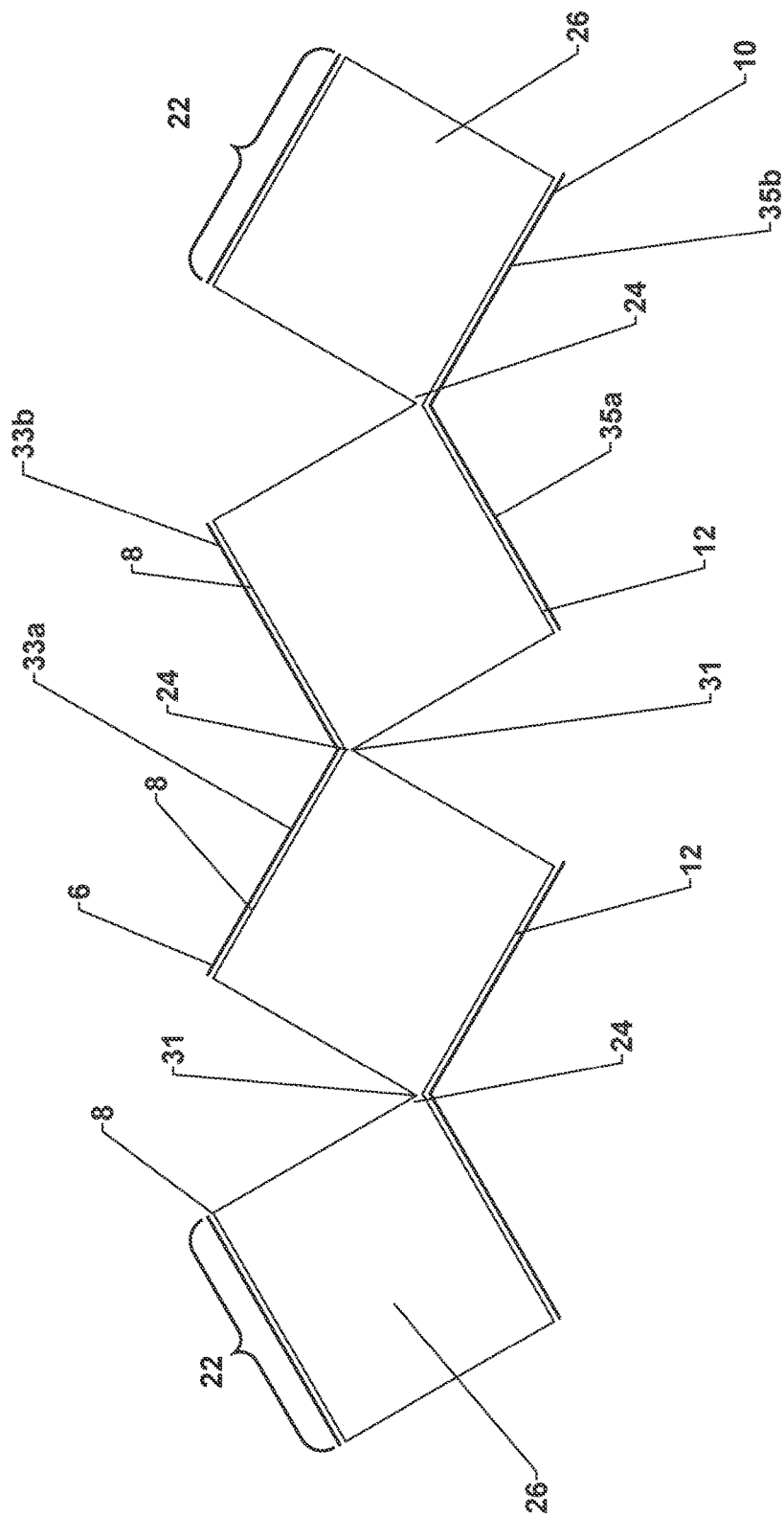
FIG. 3 shows a schematic cross-sectional view of the step of folding over the sealing tape strips produced by the cutting in FIG. 2.
Figure 4:
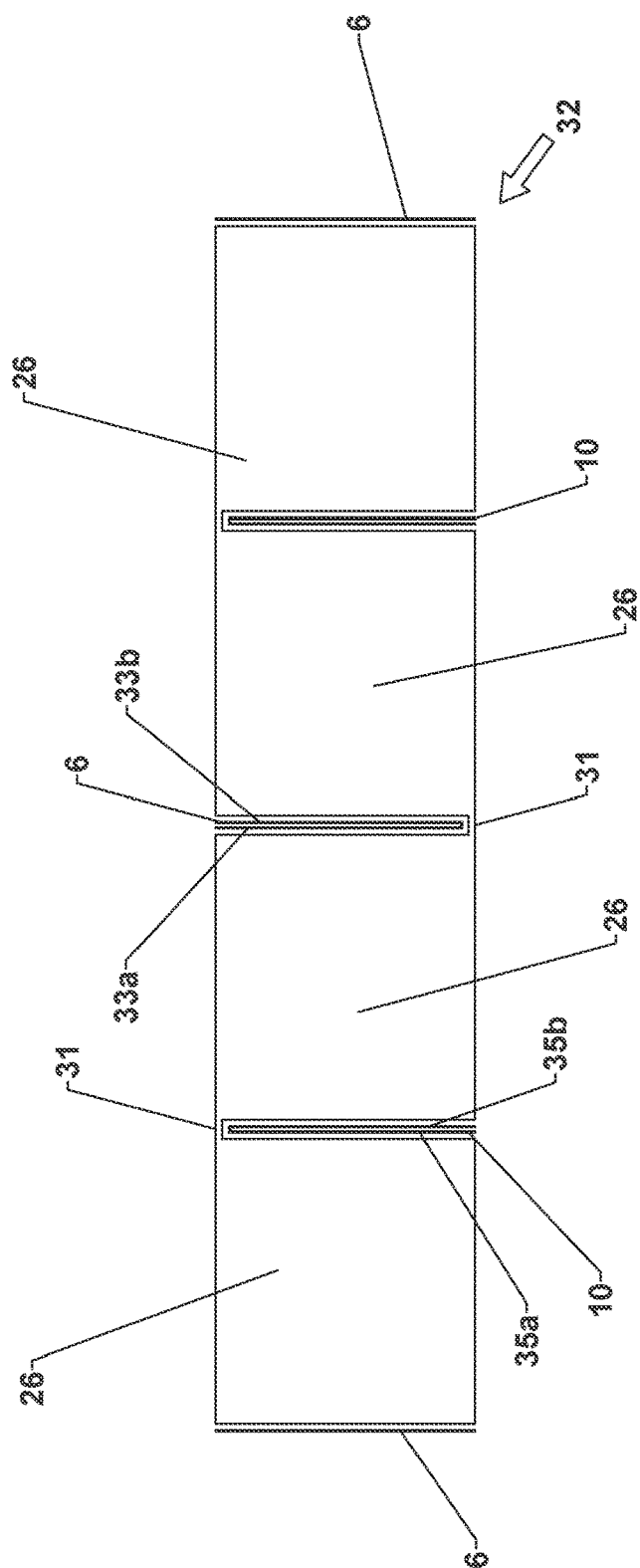
FIG. 4 shows a schematic cross-sectional view of a foam-barrier layer web produced by the folding-over step according to FIG. 3.

FIG. 3 shows the step of the folding-over of sealing tape strips 22 in the area of the connecting sections 24 to produce a foam-barrier layer web 32. A corresponding foam-barrier layer web 32 is shown in FIG. 4.

Sealing tape strips 22 which have been separated from each other by a second cut 20 are connected to each other by a connecting section 24 in the area of first surface 8. These sealing tape sections 22 are folded over in the area of these connecting sections 24 in such a way that the subsections of first surface 8 which are each adjacent to a common connecting section 24 are opposite each other. The subsections of first barrier layer 6 or the first barrier layer sections of two adjacent sealing tape strips 22 with a common connecting section 24 in the area of first surface 8 come to rest as flat as possible against each other.

Sealing tape strips 22 which have been separated from each other by a first cut 18 are connected to each other by a connecting section 24 in the area of second surface 12. These sealing tape sections 22 are again folded over in the area of these connecting sections 24 in such a way that the subsections of second surface 12 which are each adjacent to a common connecting section 24 are opposite each other. The subsections of second barrier layer 10 or the second barrier layer sections of two adjacent sealing tape strips 22 with a common connecting section 24 in the area of second surface 12 come to rest flat against each other.

The folding-over of sealing tape strips 22 in the area of the connecting sections 24 is preferably carried out while the foam web 4 or the sealing tape strips 22 are being transported in the conveying direction F. Elements can be provided to open at least one first cut 18 and the at least one second cut 20. For example, sealing tape strips 22 on the outside when seen in the transverse direction Q of foam web 4 are gripped by the elements which then pull foam web 4 apart in the transverse direction Q to open cuts 18, 20. Alternatively, the elements are introduced into at least one first cut 18 and at least one second cut 20 and spread adjacent sealing tape strips 22 gradually apart. The complete folding-over is achieved in both cases by the use of appropriate guides, which, for example, exert an appropriate pressure on the opposing surfaces of sealing tape strips 22 and thus, cause sealing tape strips 22 to fold over.

FIG. 4 shows a schematic diagram of foam-barrier layer web 32. The inward-folded subsections or barrier layer sections of first and second barrier layers 6, 10 now form barrier layers which are accommodated between two adjacent foam strips 26 are substantially perpendicular to the bottom surface of foam-barrier layer web 32 and extend over a large part of the thickness of foam-barrier layer web 32 between the top surface and the bottom surface.

As can be derived from FIGS. 3 and 4, the subsections or barrier layer sections of first barrier layer 6 to be folded over form legs 33a, 33b of first barrier layer 6 wherein two legs 33a, 33b are connected to each other. The subsections or barrier layer sections of second barrier layer 10 to be folded over form legs 35a, 35b of second barrier layer 10, wherein again legs 35a, 35b are connected to each other.

Legs 33a, 33b, 35a, 35b of first and second barrier layers 6, 10 are produced in particular by the folding-over of sealing tape strips 22 along connecting sections 24. Legs 33a, 33b of first barrier layer 6 are therefore connected to each other in the area of the associated adjacent connecting section 24. Legs 35a, 35b of second barrier layer 10 are also connected to each other in the area of the associated adjacent connecting section 24. Legs 33a, 33b of first barrier layer 6 are connected to each other in the area of the bottom surface of foam-barrier layer web 32, and legs 35a, 35b of second barrier layer 10 are connected to each other in the area of the top surface of foam-barrier layer web 32. If foam-barrier layer web 32 has several first barrier layers 6 and/or several second barrier layers 10, a first barrier layer 6 and a second barrier layer 10 preferably always occur in alternation in the transverse direction of foam-barrier layer web 32.

Legs 33a, 33b, 35a, 35b are formed by barrier layers 6, 10, wherein both first and the second barrier layers 6, 10 are each connected to adjacent foam strips 26. Legs 33a, 33b, 35a, 35b of first and second barrier layers 6, 10 therefore lie flat against associated adjacent foam strips 26.

As a result of the folding-over of sealing tape strips 22 along connecting sections 24, first and second barrier layers 6, 10 have a curved part in the area of associated adjacent connecting section 24. Two legs 33a, 33b, 35a, 35b of a barrier layer 6, 10 are then preferably connected to each other by a curved part of associated barrier layer 6, 10 in the area of the longitudinal edges of the legs. The curved part, however, can also be formed by some other strip-like material, which is connected on both sides to associated legs 33a, 33b, 35a, 35b. The curved part can be in the shape of a U or a V or can have some other geometric form. Legs 33*a*, 33*b*, 35*a*, 35*b* and the curved part can, for example, form a loop. Two legs 33*a*, 33*b*, 35*a*, 35*b* of a barrier layer 6, 10 are preferably integral in form. After the folding-over step, legs 33*a*, 33*b*, 35*a*, 35*b* of a barrier layer 6, 10 are substantially parallel to each other.

In FIG. 4, foam-barrier layer web 32 has a preferred, substantially flat shape. This is achieved in that the at least one first cut 18 and the at least one second cut 20 are introduced equal distances apart in the transverse direction Q of foam web 4 to produce sealing tape strips 22 of equal width. As can be seen from a combined consideration of FIGS. 2-4, after the folding-over to form foam-barrier layer web 32 according to FIG. 4, the width of sealing tape strips 22 in foam web 4 according to FIG. 2 corresponds to the thickness of sealing tape strips 22. A uniform width of all sealing tape strips 22 of foam web 4 therefore leads to a uniform thickness of sealing tape strips 22 in foam-barrier layer web 32.

It can also be desirable, however, for the at least one first cut 18 and the at least one second cut 20 to be introduced unequal distances apart in the transverse direction Q of foam web 4. Sealing tape strips 22 of foam web 4 then have different widths. This has the result that sealing tape strips 22 in foam-barrier layer web 32 have different thicknesses, as a result of which a profiled foam-barrier layer web 32 is obtained. Areas of application are conceivable in which, in addition to interior barrier layers 6, 10, certain areas of increased compression in the sealing tape are desired, which can be obtained by a foam-barrier layer web 32 profiled in this way.

With respect to an advantageous shape of foam-barrier layer web 32, furthermore, in cases where at least two first cuts 18 and/or at least two second cuts 20 are provided, it is preferred that, when seen in the transverse direction Q of foam web 4, a first cut 18 and a second cut 20 be introduced alternately into foam web 4. As a result, after the folding-over in the area of connecting sections 24, sealing tape strips 22 lie next to each other and do not stack on top of each other. This also contributes to the formation of a substantially flat foam-barrier layer web 32.

Two adjacent sealing tape strips 22 are connected to each other at least by connected legs 33*a*, 33*b*, 35*a*, 35*b* of associated barrier layer 6, 10. In addition, it is preferred that the subsections of first or second surface 8, 12 of foam strips 26 provided with first barrier layer 6 or second barrier layer 10 be bonded to each other after the folding-over step. This can be done in particular by heating sealing tape strips 22 before the bonding, so that the material of first barrier layer 6 and, if present, of second barrier layer 10 is heated to a temperature above its melting point or adhesion point. Depending on the material used for barrier layer 6, 10 in question, the same possibilities as those already discussed above with respect to the bonding of barrier layers 6, 10 to foam web 4 are also available here.

The heating of the material of first barrier layer 6 and/or of second barrier layer 10 can be carried out especially easily and uniformly by heating the entire foam web 4 before sealing tape strips 22 are folded over. For example, the entire web can be guided through a heating tunnel. Sealing tape strips 22 are then bonded together as soon as foam-barrier layer web 32 is folded over. If barrier layers 6, 10 have been heated completely, legs 33*a*, 33*b*, 35*a*, 3*b* of the associated barrier layer 6, 10 which are opposite each other after the folding-over step can be adhered or fused to each other over a large surface area, preferably almost completely. Legs 33*a*, 33*b*, 35*a*, 35*b* of the associated barrier layer 6, 10, however, can also be adhered or bonded together only in certain sections. It is also possible to heat foam-barrier layer web 32 only after sealing tape strips 22 have been folded over. It can be sufficient for only the edge areas of barrier layers 6, 10 to be heated. Legs 33*a*, 33*b*, 35*a*, 35*b* are then adhered or fused together only in certain areas, namely, along the outer edge areas of foam-barrier layer web 32. A reliable bonding of sealing tape strips 22 to form foam-barrier layer web 32 must be ensured.

In addition, sealing tape strips 22 of foam-barrier layer web 32 are preferably pressed together after the heating. A pressure is exerted in the transverse direction to the foam-barrier layer web, perpendicular to the subsections of first and second surfaces 8, 12 or perpendicular to the subsections or legs of first and second barrier layers 6, 10. As a result of the pressure, sealing tape strips 22 to be bonded together are pressed flat against each other to achieve a reliable bond which is as complete as possible. Even slight pressures can be sufficient for this.

Alternatively, either in addition to the heating of sealing tape strips 22 or in place of the heating of sealing tape strips 22, an additional bonding element such as an adhesive can be introduced between sealing tape strips 22.

If original foam web 4 has not yet been impregnated, the impregnation step can be carried out at this point. This is usually done by rolling in an immersion bath of an impregnating agent, squeezing out the excess impregnating agent, and then drying with the input of heat. The impregnation can also be conducted at other points in the process.

As a result of the folding-over of sealing tape strips 22, the width of the structure to be subjected to further processing changes from the width of foam web 4 to the width of foam-barrier layer web 32. In a preferred embodiment, at least one first cut 18 and at least one second cut 20 are introduced into foam web 4 at such distances apart that the width of foam-barrier layer web 32 is less than the width of foam web 4. It can therefore be desirable to arrange at least two foam-barrier layer webs 32 next to each other or under certain conditions to bond them together before the subsequent steps. It is especially preferred in this case for an assembled foam-barrier layer web 32 to be obtained with a width which is equal to the width of foam web 4. In this way, the overall width of the structure to be processed remains substantially constant throughout the entire process. In the following, therefore, foam-barrier layer web 32 being discussed can also always be a web which has been assembled from several foam-barrier layer webs 32.

Finally, at least one sealing tape roll 34 according to the invention is formed from foam-barrier layer web 32. There are substantially three different alternatives available for this, which are described on the basis of FIGS. 5*a*, 5*b*, and 5*c*.

Figure 5A:
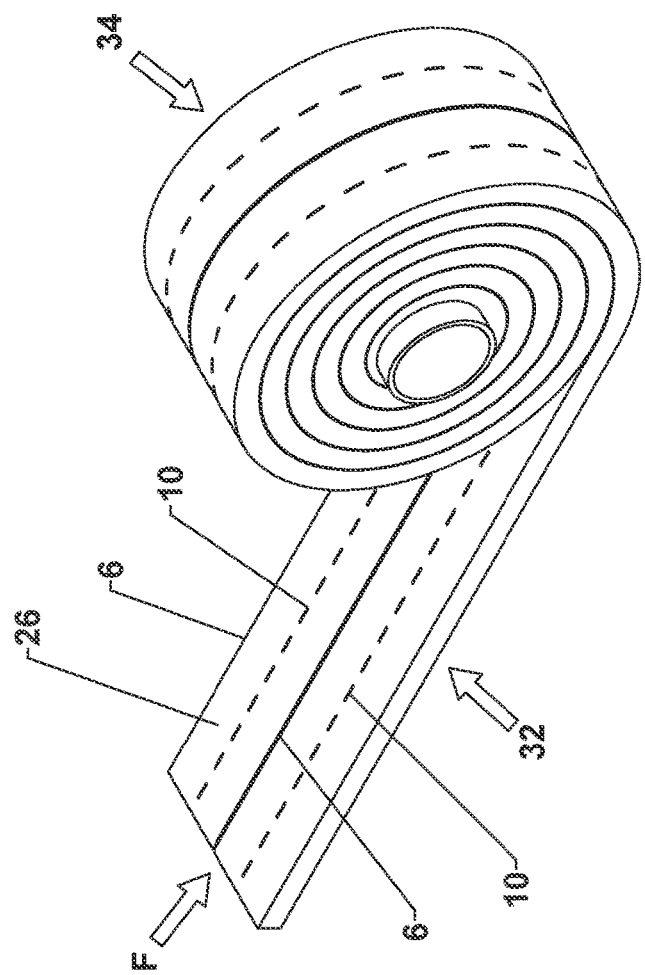
FIG. 5a shows a schematic, cross-sectional view of the step of winding up the foam-barrier layer web of FIG. 4 into a sealing tape roll.

Foam barrier layer-web 32 can already meet the requirements on the sealing tape to be produced, in particular with respect to its width and the number of interior barrier layers, which means that foam-barrier layer web 32 already forms a finished sealing element or sealing tape. Foam-barrier layer web 32 being transported in the conveying direction F can then be wound up immediately into a sealing tape roll 34, as shown in FIG. 5*a*. Sealing tape roll 34 comprises at least one interior barrier layer formed by first barrier layer 6, which extends in the radial direction of sealing tape roll 34 and is accommodated axially between two foam strips 26. Several barrier layers are usually formed by first barrier layer 6, and one or more barrier layers are formed by second barrier layer 10.

If foam-barrier layer web 32 is wider than the sealing tape to be produced or comprises more interior barrier layers than sealing tape 34 to be produced is supposed to have, foam-barrier layer web 32 can first be wound up into an intermediate roll 36. As shown in FIG. 5*b*, intermediate roll 36 is cut all the way through at one or more points in the axial direction to produce a plurality of sealing tape rolls 34, which are less wide than intermediate roll 36. The cutting-through of intermediate roll 36 is preferably carried out by one or more parallel saws 38. Only one saw 38 is shown in FIG. 5*b*, and another parallel cut for cutting through intermediate roll 36 is indicated in dashed line. The at least one cut for cutting through intermediate roll 36 is preferably introduced into a foam strip 26 so as not to damage the interior barrier layers. Here as well, other suitable cutting methods can also be used (e.g., knives, heated wires, laser cutters, water-jet cutters).

Intermediate roll 36 is cut into sealing tape rolls 34 in such a way that foam strips 26 and at least one first barrier layer 6 alternate in the axial direction of sealing tape roll 34. In a sealing tape roll 34, each radially oriented first barrier layer 6 is accommodated between two foam strips 26, as a result of which the sealing tape has an increased sealing effect against drafts and/or vapor diffusion, and each barrier layer 6 is protected from external damage at the same time. The barrier layers inside the sealing tape roll are parallel to the end surfaces of the sealing tape roll. If at least one first cut 18 and/or at least one second cut 20 are introduced into the foam web in such a way that they do not pass all the way through, remaining foam bridges 31 cover subsections or legs 33*a*, 33*b*, 35*a*, 35*b* of first and second barrier layers 6, 10 accommodated between sealing tape strips 22. Depending on the direction of the winding, there is then only one barrier layer which is visible, or neither the first nor second barrier layer 6, 10 is visible from the outside in the rolled-up state of sealing tape roll 34 or of intermediate roll 36.

Figure 5C:
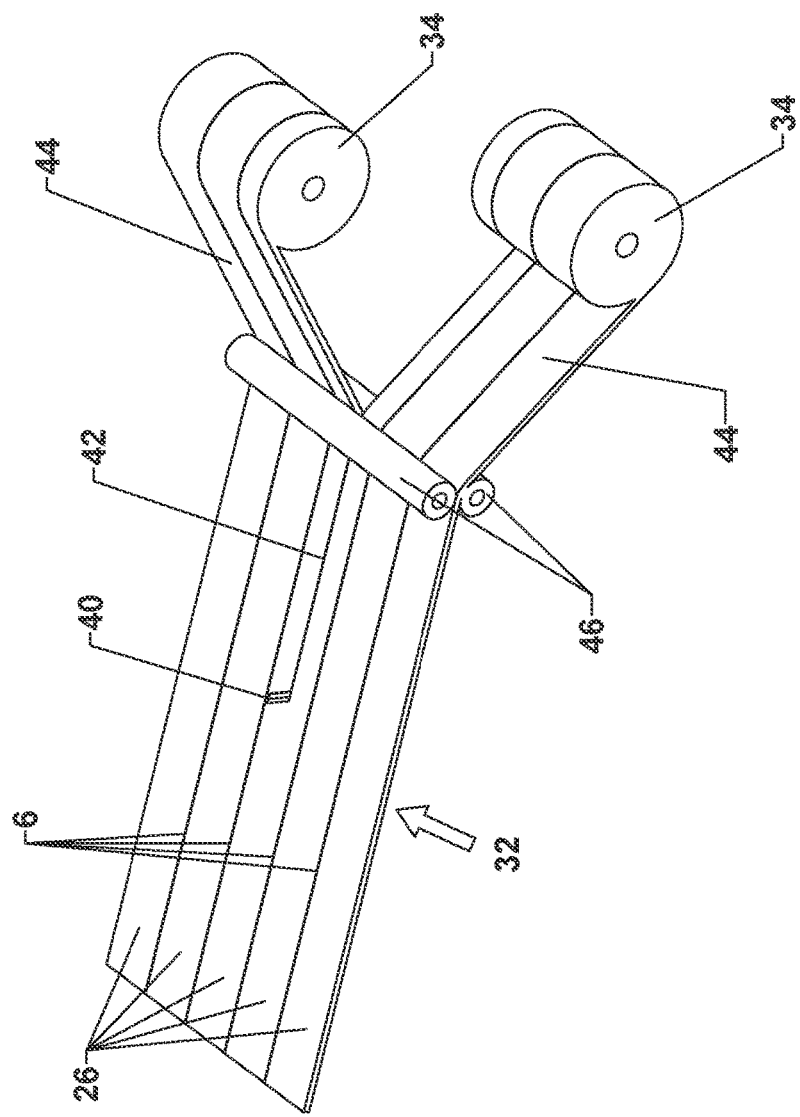
FIG. 5c shows a schematic cross-sectional view of the step of introducing a cut into the foam-barrier layer web of FIG. 4 and the winding-up of foam-barrier layer strips into individual sealing tape rolls in another alternative embodiment.

FIG. 5*c* shows another possibility for the final processing of foam-barrier layer web 32 for producing sealing tape rolls 34. In this variant, foam-barrier layer web 32 is cut through in the longitudinal direction by one or more knives 40 or saws in the area of at least one foam strip 26. At least one cut 42 is thus made in foam-barrier layer web 32, as a result of which at least two foam-barrier layer strips 44 are produced. Foam-barrier layer strips 44 then correspond to a finished sealing element or sealing tape. Each foam-barrier layer strip 44 is then wound up into a sealing tape roll 34. In this way, the step of dividing an intermediate roll 36 illustrated in FIG. 5*b* can be omitted.

In all of the embodiments, foam-barrier layer web 32 or foam-barrier layer strips 44 are compressed before they are wound up into a sealing tape roll 34. This can be done by upstream compression rollers or by a pressure exerted on foam-barrier layer web 32 or foam-barrier layer strips 44 before they are wound up. Corresponding compression rollers 46 are shown by way of example in FIG. 5*c*.

In all three exemplary embodiments according to FIGS. 5*a*-5*c*, an adhesive layer can be applied to foam-barrier layer web 32, namely, to a surface arranged transversely to barrier layers 6, 10, preferably to the bottom surface of foam-barrier layer web 32. The adhesive layer serves to bond the sealing element or sealing tape wound up into sealing tape roll 34 to the frame of a window or door. In the exemplary embodiment according to FIG. 5*c*, the adhesive layer can be applied to foam-barrier layer strips 44 after they strips have been formed. The adhesive layer is preferably configured as a single-sided or double-sided adhesive tape lined on one side with a peel-off film. The adhesive tape is for its own part stored on a coil or roll and is pulled off from it. The application of the adhesive tape to foam-barrier layer web 32 is preferably carried out simultaneously with the winding-up of foam-barrier layer web 32 into intermediate roll 36 or into sealing tape roll 34, wherein compression rollers 46 generate the pressure required to bond the adhesive tape to foam-barrier layer web 38 or to foam-barrier layer strips 44.

Another exemplary embodiment of a method for producing an alternative sealing tape roll 34 according to the invention is described on the basis of FIGS. 6-9.

Figure 6:
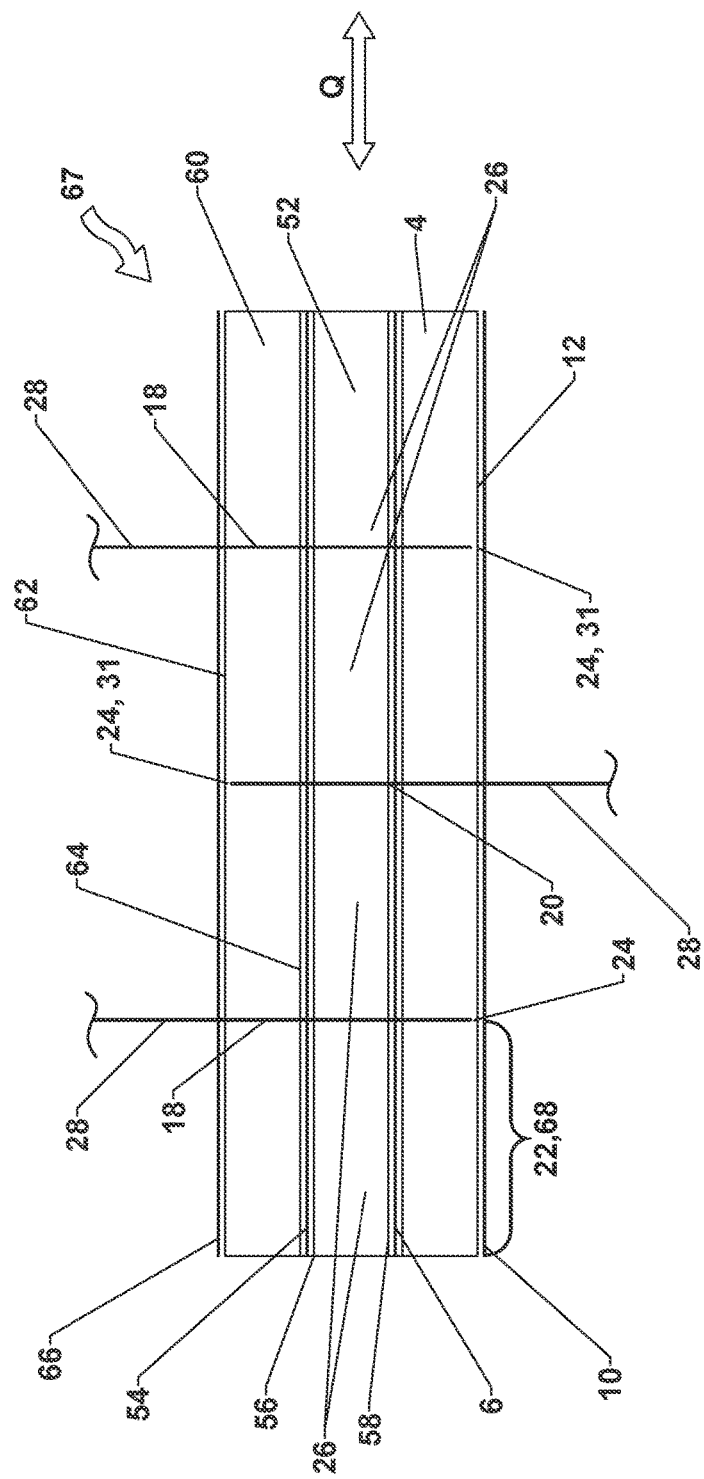
FIG. 6 shows a schematic cross-sectional view of the step of introducing first and second cuts into a plurality of foam webs stacked on top of each other according to another alternative embodiment.

As can be seen in FIG. 6, foam web 4, which corresponds to a first foam web 4, is provided initially in this embodiment as well, and first barrier layer 6 is applied to first surface 8, here the top surface. Second barrier layer 10 is applied to second surface 12, here, the bottom surface of first foam web 4. This is followed by the step of applying a second foam web 52 to first barrier layer 6. A third barrier layer 54 is preferably applied to a first surface 56 of second foam web 52. First surface 56 of second foam web 52 corresponds in this example to a top surface of second foam web 52, whereas a second surface 58 of second foam web 52 corresponds to a bottom surface of the same web. Second surface 58 of second foam web 52 rests flat against first barrier layer 6.

A third foam web 60, furthermore, can be applied to third barrier layer 54. Third foam web 60 comprises a first surface 62 and a second surface 64, wherein here first surface 62 corresponds to a top surface and second surface 64 corresponds to a bottom surface of third foam web 60. Second surface 64 of third foam web 60 rests flat against third barrier layer 54. Finally, a fourth barrier layer 66 is applied to first surface 62 of third foam web 60. Each barrier layer 6, 10, 54, 66 is bonded to the adjacent foam web or adjacent foam webs 4, 52, 60. With respect to the materials of the barrier layers and the bonding of a barrier layer to a foam web, reference can be made to the discussion of first and second barrier layers 6, 10 and of their bonding to foam web 4.

The application of additional foam webs and barrier layers can be repeated as often as desired to produce a multilayer foam web-barrier layer stack 67, which comprises at least two foam webs. After the multilayer foam-barrier layer stack 67 of the desired thickness has been formed, the method is continued according to FIG. 6.

Foam-barrier layer stack 67 of this embodiment corresponds to a multilayer foam-barrier layer web 32 of the embodiment according to FIGS. 2-4. Accordingly, the external barrier layers of foam-barrier layer stack 67, here second barrier layer 10 and fourth barrier layer 66, occur in place of first and second barrier layers 6, 10 of the first embodiment.

FIG. 6 shows the step of introducing at least one first cut 18 and at least one second cut 20 into the multilayer foam web-barrier layer stack 67. At least one first cut 18 is introduced here as well into first surface 8 of first foam web 4, and at least one second cut 20 is introduced here as well into second surface 12 of first foam web 4. More precisely, at least one first cut 18 is introduced into foam web-barrier layer stack 67 starting from the first surface of the uppermost foam web, here first surface 62 of third foam web 60. Second cut 20 is introduced into foam web-barrier layer stack 67 starting from the second surface of the lowermost foam web, here second surface 12 of first foam web 4. By introducing at least one first cut 18 and at least one second cut 20 in the longitudinal direction of foam webs 4, 52, 60 and offset from each other in the transverse direction Q, parallel sealing tape sections 68 are formed. Between two adjacent sealing tape sections 68 there remains a connecting section 24. Sealing tape sections 68 of this embodiment correspond to multilayer sealing tape strips 22 of the embodiment according to FIGS. 2-4.

It can be seen that the introduction of at least one first cut 18 and the introduction of at least one second cut 20 are carried out in the same way as that described above with reference to FIG. 2 based on the first exemplary embodiment.

Sealing tape sections 68 in this exemplary embodiment are formed out of several sealing tape strips 22 arranged on top of each other. Each sealing tape section 68 therefore consists of a plurality of foam strips 4, 52, 60, and a plurality of barrier layers 6, 10, 54, 66. Sealing tape sections 68 adjacent to a first cut 18 are connected to each other by a connecting section 24 in the area of second surface of the lowermost foam web, here second surface 12 of first foam web 4. Sealing tape sections 68 adjacent to a second cut 20 are connected to each other by a connecting section 24 in the area of the first surface of the uppermost foam web, here first surface 62 of third foam web 60. Each connecting section 24 can comprise a foam bridge 31 or be formed only by barrier layer 6, 66 arranged in connecting section 24 in question.

Figure 7:
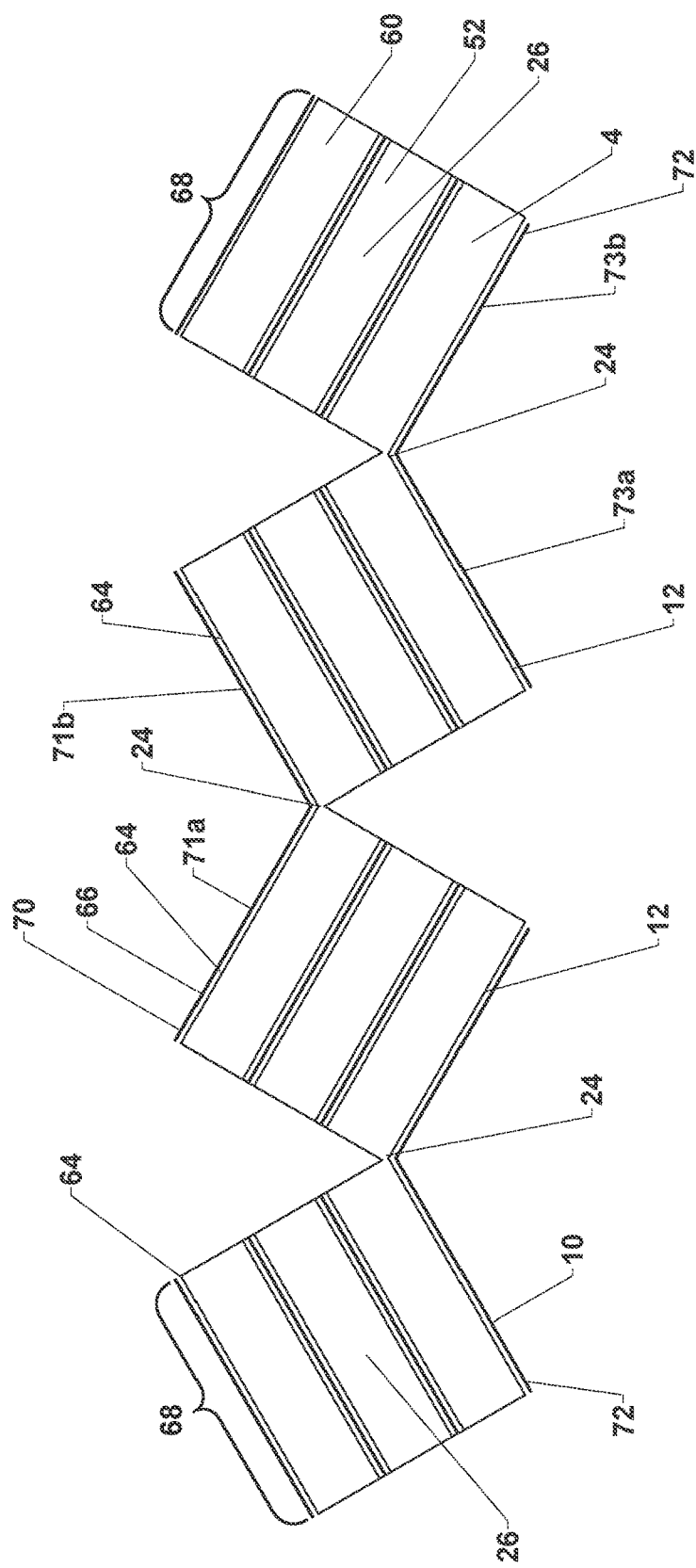
FIG. 7 shows a schematic cross-sectional view of the step of folding-over the sealing tape sections of FIG. 6 produced by the cutting step.

FIG. 7 illustrates the step of folding over sealing tape sections 68 formed by the cutting operation. The folding-over of sealing tape sections 68 is carried out in the area of connecting sections 24 to form a foam-barrier layer web 32 like that shown in FIG. 8. This means that, here, too, sealing tape strips 22 from which each sealing tape section 68 is formed are folded over in the area of connecting sections 24.

Sealing tape sections 68 are folded over in such a way that subsections of second surface 12 of lowermost foam web 4 which are each adjacent to a common connecting section 24 are opposite each other, and subsections of first surface 62 of uppermost foam web 60 which are each adjacent to a common connecting section 24 are opposite each other. For the rest, the discussion of FIG. 3 applies here, too, except that a multilayer sealing tape section 68 takes the place of a sealing tape strip 22.

In this exemplary embodiment, at least one first cut 18 divides barrier layer 66 in the area of the first surface of the uppermost foam web, here first surface 62 of third foam web 60, adjacent to a common connecting section 24, into a plurality of subsections of barrier layer 66. Each of the plurality of these subsections forms a first barrier layer section 70, which, after sealing tape sections 68 have been folded over, is accommodated between two adjacent sealing tape sections 68.

In this exemplary embodiment, at least one second cut 20 divides barrier layer 10 in the area of the second surface of the lowermost foam web, here second surface 12 of first foam web 4, adjacent to a common connecting section 24 into a plurality of subsections of barrier layer 10. Each of the plurality of these subsections forms a second barrier layer section 72, which, after sealing tape sections 68 have been folded over, is accommodated between two adjacent sealing tape sections 68.

It can be seen that, in the embodiment according to FIGS. 2-4, at least one first barrier layer section 70 corresponds to a subsection of first barrier layer 6, and at least one second barrier layer section 72 corresponds to a subsection of second barrier layer 10. It can be seen especially easily in FIG. 7, that at least one first barrier layer section 70 comprises two legs 71, 71b, which are connected to each other. Legs 71a, 71b are obtained in particular by the folding-over of sealing tape sections 68 along connecting sections 24. Legs 71a, 71b of first sealing tape section 70 are therefore, connected to each other in the area of the associated adjacent connecting section 24. At least one second barrier layer section 72 also comprises two legs 73a, 73b. Legs 73a, 73b of a second barrier layer section 72 are connected to each other in the area of an associated adjacent connecting section 24. Legs 71a, 71b of the at least one first barrier layer section 70 are connected to each other in the area of a bottom surface 78 of foam-barrier layer web 32, and legs 73a, 73b of the at least one second barrier layer section 72 are connected to each other in the area of a top surface 76 of foam-barrier layer web 32. If foam-barrier layer web 32 comprises several first barrier layer sections 70 and/or several second barrier layer sections 72, a first barrier layer section 70 and a second barrier layer section 72 always occur in alternation when seen in the functional direction X.

Legs 71a, 71b, 73a, 73b are formed by barrier layer sections 70, 72, wherein both first and second barrier layer sections 70, 72 are each connected to sealing tape sections 68 adjacent to foam strips 26. Legs 71a, 71b, 73a, 73b of the at least one first and of the at least one second barrier layer sections 70, 72 therefore lie flat against the associated adjacent foam strips 26.

As a result of the folding-over of sealing tape sections 68 along the connecting sections 24, at least one first and at least one second barrier layer sections 70, 72 are curved in the area of the associated adjacent connecting sections 24. Two legs 71, 71b, 73a, 73b of a barrier layer section 70, 72 are then preferably connected to each other by a curved part of barrier layer section 70, 72 in question. The curved part, however, can also be formed by a different strip-like material, which is connected on both sides to associated legs 71a, 71b, 73a, 73b. The curved part can have the shape of a U or a V or have some other geometric form. Legs 71, 71b, 73a, 73b and the curved part can form a loop, for example. Two legs 71, 71b, 73a, 73b of a barrier layer section 70, 72 are preferably integral in form. In particular, it is preferred that two legs 71, 71b, 73a, 73b of a barrier layer section 70, 72 are each connected to each other by a part of the associated barrier layer section 70, 72. After the folding-over step, legs 71, 71b, 73a, 73b of a barrier layer section 70, 72 are substantially parallel to each other.

FIG. 8 shows foam-barrier layer web 32 consisting of a plurality of sealing tape sections 68 produced by the folding-over step of FIG. 7 arranged next to each other. As can be seen, at least one first barrier layer section 70 and at least one second barrier layer section 72 now form barrier layers which are accommodated between two adjacent sealing tape sections 68, are substantially perpendicular to the bottom surface of foam-barrier layer web 32, and extend over a large part of the thickness of foam-barrier layer web 32 between the top surface and the bottom surface.

In addition, each sealing tape section 68 comprises additional barrier layers, which consist of the folded-over subsections of first and third barrier layers 6, 54. Because the barrier layer sections of first and third barrier layers 6, 54 were not bent by the folding-over step, they extend as a single layer within a sealing tape section 68 from top surface 76 to bottom surface 78.

It is preferred that sealing tape sections 68, in correspondence with sealing tape strips 22 of the embodiment according to FIG. 4, be bonded together after the folding-over step by adhering or fusing the adjacent legs of the barrier layer sections. Sealing tape sections 68 are preferably also heated before the folding-over or alternatively only after the folding-over.

Analogously to FIGS. 5a-5c, at least one sealing tape roll 34 can be formed from foam-barrier layer web 32 according to FIG. 8.

Foam-barrier layer web 32 can already correspond to a sealing element or sealing tape and be wound up immediately into a sealing tape roll 34. Foam-barrier layer web 32 can also be wound up into an intermediate roll 36, which is cut through at several points in the axial direction to form a plurality of sealing tape rolls 34; or through the introduction of at least one cut 42 in foam-barrier layer web 32, it can be cut into a plurality of foam-barrier layer strips 44 forming the sealing element, which are then wound up into individual sealing tape rolls 34. Details on the production of sealing tape rolls 34 from foam-barrier layer web 32 can be derived from the description of FIGS. 5a-5c.

Finally, a sealing element 74 produced according to the invention is described with respect to FIGS. 4 and 8. The sealing element can be a sealing tape to be rolled up into a sealing tape roll 34 of flexible, compressible foam with at least one barrier layer extending in the radial direction. The sealing element can also be, however, foam-barrier layer web 32 or a strip 44 separated from foam-barrier layer web 32, from which a sealing tape roll 34 is formed in the further course of the process.

Sealing element 74 of flexible foam comprises a top surface 76, a bottom surface 78, and two side surfaces 80, 82 connecting top surface 76 to bottom surface 78. Sealing element 74 also comprises at least three sealing tape sections 68. Sealing tape sections 68 can each comprise one or more sealing tape strips 22. Sealing tape sections 68 are arranged next to each other in a functional direction X of sealing element 74. The functional direction X is parallel to bottom surface 78 and preferably perpendicular to side surfaces 80, 82 and is indicated in FIG. 8 by the arrow X.

At least one first barrier layer section 70 and at least one second barrier layer section 72 are each accommodated between two adjacent sealing tape sections 68. At least one first barrier layer section 70 and the at least one second barrier layer section 72 connect the associated adjacent sealing tape sections 68 at least by the curved part which connects legs 71a, 71b, 73a, 73b of associated barrier layer section 70, 72 and are parallel to side surfaces 80, 82 in sealing element 74. If sealing tape sections 68 each comprise several sealing tape strips 22, then additional barrier layer sections of first and third barrier layers 6, 54 parallel to side surfaces 80, 82 are accommodated in each sealing tape section 68, these additional barrier layer sections extending preferably all the way through sealing element 74.

In an installed state in which sealing element 74 has been inserted into a joint between a frame element and a masonry wall, top surface 76 and bottom surface 78 rest against the opposing surfaces of the frame element and of the masonry wall which form the joint. Barrier layer sections 70, 72 extend transversely through the joint from the frame element to the masonry wall. The functional direction X of sealing element 74 is parallel to the surfaces of the frame element and of the masonry wall facing the joint and extends from the inside to the outside of the room and perpendicular to the planes of first barrier layer section 70 and of second barrier layer section 72. The diffusion of water vapor between the inside of the room and the outside of the room through the sealing element is therefore decisively influenced by barrier layer sections 70, 72.

To attach sealing element 74 to the frame element, sealing element 74 can be equipped with an adhesive layer. The adhesive layer is preferably applied to bottom surface 78 of sealing element 74. The adhesive layer can be formed by a double-sided adhesive tape or by a liquid or viscous adhesive. Alternatively, the adhesive layer can be applied to top surface 76 of sealing element 74 and/or serve to bond sealing element 74 to the masonry wall.

Legs 71a, 71b, 73a, 73b and the curved part of at least one first barrier layer section 70 and of at least one second barrier layer section 72 each form, in one embodiment, a loop 50 between adjacent sealing tape sections 68. At least one first barrier layer section 70 forms loop 50 in the area of bottom surface 78 of sealing element 74, and at least one second barrier layer section 72 forms loop 50 in the area of top surface 76 of sealing element 74. If sealing element 74 comprises several first barrier layer sections 70 and/or several second barrier layer sections 72, a first barrier layer section 70 and a second barrier layer section 72 always occur in alternation in the functional direction X. The reason for this is that preferably at least one first cut 18 and at least one second cut 20 are preferably also introduced in alternation in the transverse direction Q of foam web 4.

Loop 50 is formed by the folding-over of sealing tape sections 68 and by the associated folding-over of barrier layer sections 70, 72. Each loop 50 comprises two substantially parallel legs 71a, 71b, 73a, 73b and curved part 84. Legs 71, 71b, 73a, 73b of loop 50 are also formed by the subsections of first or second barrier layer section 70, 72 which rest flat against associated adjacent foam strips 26. In the area of connecting section 24, barrier layer sections 70, 72 form curved part 84 after the folding-over of sealing tape sections 68, so that two legs 71a, 71b, 73a, 73b of loop 50 come to rest against each other.

To connect the two adjacent sealing tape sections 68, two legs 71a, 71b, 73a, 73b of each loop 50 are preferably adhered to each other, at least in certain areas. It is preferred that the legs of loops 50 be adhered to each other over as much of their surface areas as possible. Adhesion over only a portion of the surface area, however, can also be sufficient to bond sealing tape sections 68 together. If sufficient pressure is exerted on foam-barrier layer web 32 in the functional direction X, the loop can also be adhered in the area of curved part 84.

It is obvious that the previous statements can also apply when legs 71a, 71b, 73a, 73b and curved part 84 of at least one first barrier layer section 70 and of at least one second barrier layer section 72 do not form a loop 50 but have some other type of shape.

To form sealing element 74, it is also preferred that at least one first barrier layer section 70 and at least one second barrier layer section 72 comprise a film. Possible materials of a barrier layer have already been described above with reference to the materials of first and second barrier layers 6, 10.

It can be seen from the discussion above that the structural difference between the embodiments described here consists substantially in that, in the first embodiment, only one foam web is used, whereas, in the second embodiment, a plurality of foam webs is used. Aside from the special features to be derived from that difference, the embodiments are substantially identical insofar as, in particular, their properties or the properties and features of the sealing tape roll to be produced are concerned. The features of different embodiments can therefore be readily combined with each other.

A wide variety of materials are available for the various parts discussed and illustrated herein. While the principles of this device have been described in connection with specific embodiments, it should be understood clearly that these descriptions are made only by way of example and are not intended to limit the scope of the device.

The invention claimed is:

1. A sealing tape roll of flexible, compressible foam with at least two barrier layers extending in a radial direction, which are arranged axially between two layers of foam, wherein the sealing tape roll comprises a sealing element wound up into the sealing tape roll, the sealing element comprising:
- a top surface, a bottom surface, and two side surfaces connecting the top surface to the bottom surface;
- at least three sealing tape sections, which are arranged next to each other in a functional direction of the sealing element, wherein the functional direction is parallel to the bottom surface and perpendicular to the side surfaces; and
- at least one first barrier layer section and at least one second barrier layer section, which are each arranged between two adjacent sealing tape sections and extend parallel to the side surfaces within the sealing element;

wherein the at least one first barrier layer section comprises two legs, which are connected to each other, and the at least one second barrier layer section comprises two legs, which are connected to each other; the legs of the at least one first barrier layer section are connected to each other in an area of the bottom surface of the sealing element, and the legs of the at least one second barrier layer section are connected to each other in an area of the top surface of the sealing element.

2. The sealing tape roll of claim 1 wherein the sealing element comprises several first and/or several second barrier layer sections and when viewed in the functional direction, one first barrier layer section and one second barrier layer section always occur in alternation.

3. The sealing tape roll of claim 1 wherein the at least one first barrier layer section and the at least one second barrier layer section comprises a film.

4. The sealing tape roll of claim 1 wherein the legs of the at least one first barrier layer section are integral in form and the legs of the at least one second barrier layer section are integral in form.

5. The sealing tape roll of claim 1 wherein the two legs of a first or second barrier layer section are adhered to each other at least over certain areas.

6. The sealing tape roll of claim 1 wherein the legs of the at least one first and of the at least one second barrier layer section rest flat against a foam strip adjacent to the corresponding leg.

7. The sealing tape roll of claim 1 wherein at least one additional barrier layer section which is parallel to the side surfaces is arranged within each sealing tape section.

8. The sealing tape roll of claim 1 wherein the bottom surface of the sealing element comprises an adhesive layer for bonding the sealing element to a frame element.

9. The sealing tape roll of claim 1 wherein the sealing element is wound up into the sealing tape roll around an axis which is parallel to the functional direction and whereby a top surface of one turn of the sealing tape roll rests against a bottom surface of an adjacent turn of the sealing tape roll and the side surfaces of the sealing element form end surfaces of the sealing tape roll.

10. The sealing tape roll of claim 1 wherein the legs of the at least one first barrier layer section and the legs of the at least one second barrier layer section are each substantially parallel and the two legs of a barrier layer section comprise a curved part connecting the legs.

11. The sealing tape roll of claim 10 wherein the curved part has the shape of a U or a V.

12. The sealing tape roll of claim 1 wherein two adjacent sealing tape sections of the sealing element are connected to each other by a connecting section.

13. The sealing tape roll of claim 12 wherein the connecting section comprises the at least one first barrier layer section or the at least one second barrier layer section.

14. The sealing tape roll of claim 12 wherein the connecting section comprises a foam bridge.

15. The sealing tape roll of claim 14 wherein the foam bridge has a maximum thickness of 2 mm.

* * * * *